United States Patent
Song et al.

(10) Patent No.: US 11,195,991 B2
(45) Date of Patent: Dec. 7, 2021

(54) MAGNETIC RANDOM ACCESS MEMORY ASSISTED DEVICES AND METHODS OF MAKING

(71) Applicant: TAIWAN SEMICONDUCTOR MANUFACTURING CO., LTD., Hsinchu (TW)

(72) Inventors: MingYuan Song, Hsinchu (TW); Shy-Jay Lin, Jhudong Township (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 68 days.

(21) Appl. No.: 16/582,015

(22) Filed: Sep. 25, 2019

(65) Prior Publication Data
US 2020/0106002 A1    Apr. 2, 2020

Related U.S. Application Data

(60) Provisional application No. 62/737,301, filed on Sep. 27, 2018.

(51) Int. Cl.
H01L 43/06  (2006.01)
H01L 43/14  (2006.01)
(Continued)

(52) U.S. Cl.
CPC ............ H01L 43/06 (2013.01); G11C 11/161 (2013.01); G11C 11/18 (2013.01); H01F 10/329 (2013.01);
(Continued)

(58) Field of Classification Search
USPC .................................................. 257/295, 427
See application file for complete search history.

(56) References Cited

U.S. PATENT DOCUMENTS 9,824,735 B1    11/2017 Kan et al.
2005/0199926 A1*   9/2005 Fukuzumi ............... H01L 43/08
257/295
(Continued)

FOREIGN PATENT DOCUMENTS

CN    108336222 A    7/2018
KR    20180061555 A    6/2018
(Continued)

OTHER PUBLICATIONS

Can Onur Avci, "Current-induced switching in a magnetic insulator," Nature Materials, 7 pages (2016).
(Continued)

*Primary Examiner* — Nduka E Ojeh
(74) *Attorney, Agent, or Firm* — McDermott Will & Emery LLP

(57) ABSTRACT

A magnetic random access memory assisted non-volatile Hall effect device includes a spin orbit torque layer disposed over a substrate, and a magnetic layer disposed over the spin orbit torque layer. A metal oxide layer disposed over the magnetic layer. Portions of the spin orbit torque layer extend outward from the magnetic layer and the metal oxide layer on opposing sides of a first direction and opposing sides of a second direction in plan view, and the second direction is perpendicular to the first direction.

20 Claims, 23 Drawing Sheets

(51) Int. Cl.
  *H01F 10/32*   (2006.01)
  *G11C 11/16*   (2006.01)
  *G11C 11/18*   (2006.01)
  *H01L 43/10*   (2006.01)
  *H01L 27/22*   (2006.01)
  *H04L 9/32*    (2006.01)
  *H01F 41/34*   (2006.01)

(52) U.S. Cl.
  CPC ..... *H01F 10/3254* (2013.01); *H01F 10/3286* (2013.01); *H01F 41/34* (2013.01); *H01L 27/222* (2013.01); *H01L 43/14* (2013.01); *H04L 9/3278* (2013.01); *G11C 11/1673* (2013.01); *G11C 11/1675* (2013.01); *H01L 43/10* (2013.01)

(56) References Cited

U.S. PATENT DOCUMENTS

| | | | |
|---|---|---|---|
| 2017/0212728 A1 | 7/2017 | Sethi et al. | |
| 2017/0331484 A1* | 11/2017 | Kudo | H01F 10/329 |
| 2018/0123021 A1* | 5/2018 | Sasaki | G11C 11/18 |
| 2018/0151209 A1 | 5/2018 | Lim et al. | |
| 2019/0326353 A1* | 10/2019 | O'Brien | H01F 10/3254 |
| 2020/0006630 A1* | 1/2020 | Sato | H01F 10/329 |

FOREIGN PATENT DOCUMENTS

| | | | |
|---|---|---|---|
| TW | 201705568 A | 2/2017 | |
| WO | 2014/018920 A1 | 1/2014 | |
| WO | WO-2019140729 A1 * | 7/2019 | ............. H01L 43/08 |

OTHER PUBLICATIONS

Jairo Sinova et al., "Spin Hall Effects," Rev. Mod. Phys., vol. 87, pp. 1213-1259, Oct.-Dec. 2015.

Jayita Das et al., "MRAM PUF: A Novel Geometry Based Magnetic PUF With Integrated CMOS," IEEE Transactions on Nanotechnology, vol. 14, No. 3. pp. 436-443, May 2015.

Achiranshu Garg et al., "Design of SRAM PUF with Improved Uniformity and Reliability Utilizing Device Aging Effect," In: IEEE International Symposium on Circuits and Systems, Melbourne, pp. 1941-1944 (2014).

Anatoly Andrusevich, "Nonvolatile Standby/On Switch," (2009) Retrieved from https://www.maximintegrated.com/en/design/technical-documents/app-notes/4/4624.html.

Lewis Loflin, "Introduction Hall Effect Switches Sensors Circuits Tutorial," Retrieved from the internet on Sep. 24, 2019 http://www.bristolwatch.com/hall_effect/index.htm.

* cited by examiner

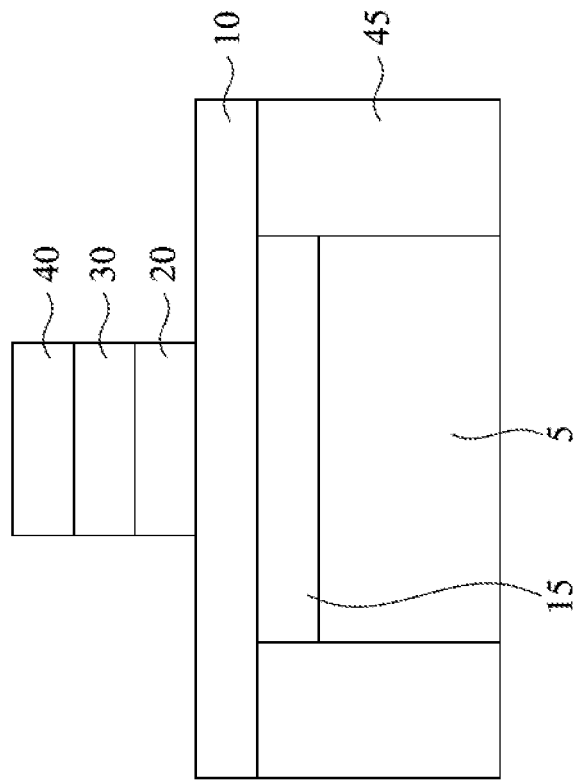
FIG. 8C
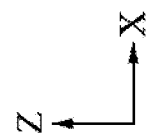

| 1 | 0 | 1 | 1 | 0 | 1 | 0 | 1 |
|---|---|---|---|---|---|---|---|
| 0 | 0 | 1 | 0 | 1 | 1 | 0 | 1 |
| 1 | 1 | 0 | 1 | 0 | 0 | 1 | 0 |
| 0 | 0 | 0 | 1 | 1 | 1 | 0 | 1 |
| 0 | 0 | 0 | 1 | 1 | 0 | 1 | 0 |
| 1 | 1 | 1 | 0 | 0 | 0 | 1 | 0 |
| 1 | 0 | 0 | 0 | 1 | 1 | 0 | 1 |
| 1 | 0 | 1 | 1 | 0 | 0 | 1 | 1 |
| 0 | 1 | 0 | 0 | 1 | 1 | 0 | 1 |
| 1 | 1 | 0 | 1 | 0 | 1 | 1 | 0 |

MAGNETIC RANDOM ACCESS MEMORY ASSISTED DEVICES AND METHODS OF MAKING

RELATED APPLICATION

This application claims priority to U.S. Provisional Patent Application No. 62/737,301 filed Sep. 27, 2018, the entire contents of which are incorporated herein by reference.

BACKGROUND

A magnetic random access memory (MRAM) offers comparable performance to volatile static random access memory (SRAM) and comparable density with lower power consumption to volatile dynamic random access memory (DRAM). Compared to non-volatile memory (NVM) flash memory, an MRAM offers much faster access times and suffers minimal degradation over time, whereas a flash memory can only be rewritten a limited number of times. One type of an MRAM is a spin transfer torque random access memory (STT-RAM). An STT-RAM utilizes a magnetic tunneling junction (MTJ) written at least in part by a current driven through the MTJ. Another type of an MRAM is a spin orbit torque RAM (SOT-RAM).

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 8A, 8B, and 8C show one of the various stages of a manufacturing operation for an MRAM assisted NVM Hall effect device according to an embodiment of the present disclosure.

FIG. 18 illustrates the randomness of an MRAM assisted non-volatile physically unclonable device according to an embodiment of the present disclosure.

DETAILED DESCRIPTION

Figure 1:
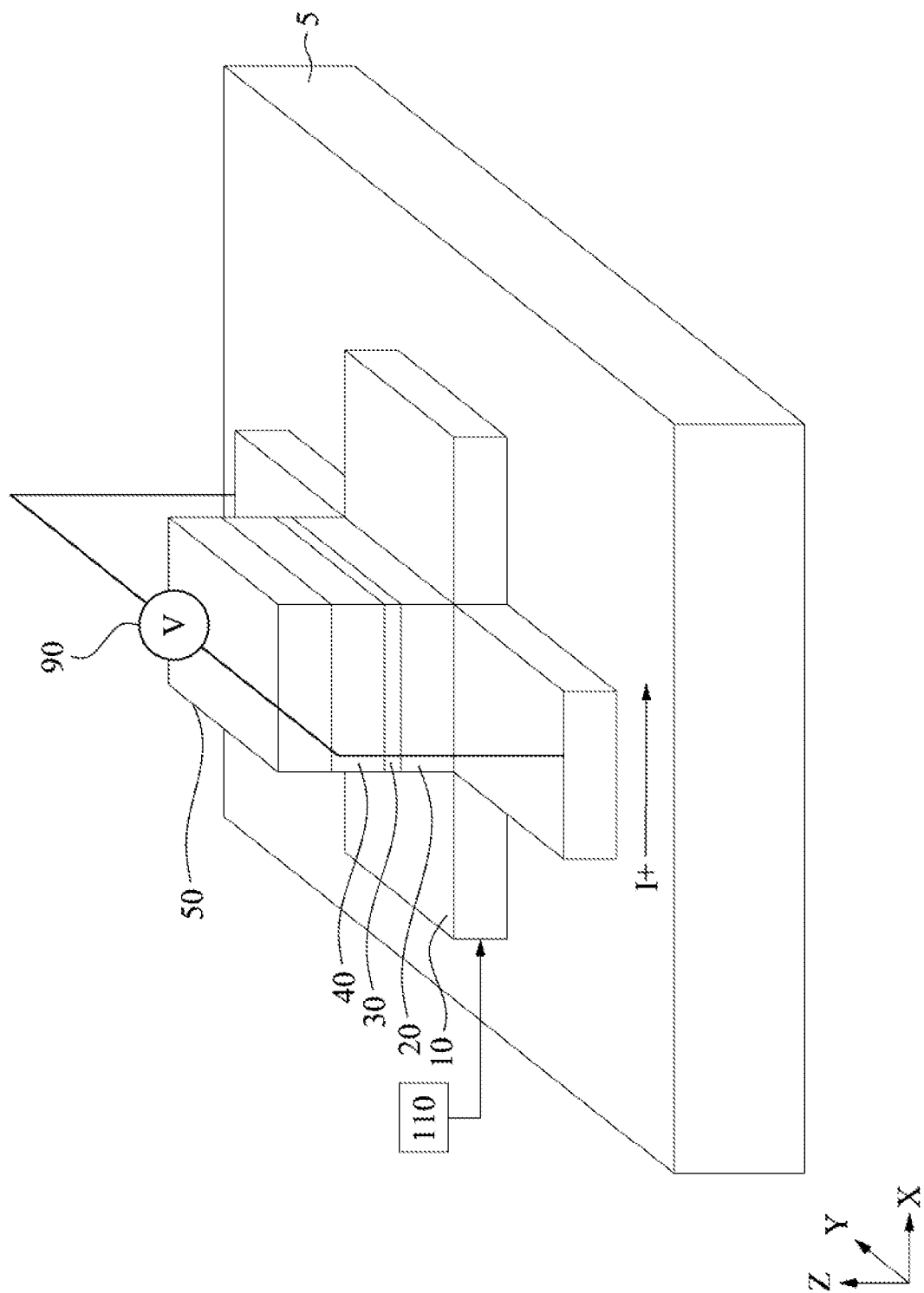
FIG. 1 is a schematic illustration of an MRAM assisted NVM Hall effect device according to an embodiment of the disclosure.

It is to be understood that the following disclosure provides many different embodiments, or examples, for implementing different features of the invention. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity. In the accompanying drawings, some layers/features may be omitted for simplification.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. In addition, the term "made of" may mean either "comprising" or "consisting of." Further, in the following fabrication process, there may be one or more additional operations in/between the described operations, and the order of operations may be changed. In the present disclosure, a phrase "one of A, B and C" means "A, B and/or C" (A, B, C, A and B, A and C, B and C, or A, B and C), and does not mean one element from A, one element from B and one element from C, unless otherwise described.

An STT MRAM has features, such as non-volatile nature, compatibility with silicon-complementary metal oxide semiconductor (Si-CMOS) technology, fast read and write speed, high endurance and retention of data, a relatively small bit-cell size and environmental robustness, and thus is the next disruptive technology for all CMOS integrated circuits (ICs) that require memory. A high-value emerging application for a STT MRAM is a low-level cache for a central processing unit (CPU) or a microcontroller unit (MCU), which offers the attractive benefit of system speed boost and faster turn-on due to its non-volatility. However, this application puts a strenuous requirement on the memory's speed, more specifically on write speed that is much slower than read speed. The cache application for an MCU additionally requires low-power consumption, which is hard for a STT MRAM, because it takes substantial current to change the magnetization state during the write operation. In current STT MRAM art, write speed improvement via a film stack and write scheme optimization and write current reduction via stack optimization and CD reduction may be stalled due to inevitable performance trade-off in endurance and retention. Novel ideas, like a high frequency-assisted write operation, have been proposed, which may not be feasible. There is a significant gap between the best reported STT MRAM write speed and current and those required by cache applications, which could amount to a show stopper.

In contrast, spin-orbital-transfer (or torque) (SOT) magnetic switching is an emerging write concept that has the potential to provide an order-of-magnitude improvement on write current and speed. SOT is considered as a solution for high-speed, low power cache applications.

FIG. 1 is a schematic view of an MRAM assisted non-volatile memory (NVM) Hall effect that utilizes spin-orbit interaction in switching according to an embodiment of the present disclosure.

The MRAM assisted NVM Hall effect device includes a bottom metal layer 10, as a spin-orbit interaction (SOT) active layer, formed over a support layer 5. Further, the MRAM assisted NVM Hall effect device includes a first magnetic layer 20, which is a free magnetic layer or a data storage layer, disposed over the bottom metal layer 10, a metal oxide layer 30 disposed over the first magnetic layer 20, and in some embodiments, a second magnetic layer 40, as a reference layer, disposed over the metal oxide layer 30. In some embodiments, the metal oxide layer 30 is nonmagnetic. In some embodiments, a top conductive layer 50, as an electrode, is disposed over the second magnetic layer 40.

The magnetic moment of the free layer 20 (first magnetic layer) is switched using the spin-orbit interaction effect. In some embodiments, the magnetic moment of the first magnetic layer 20 is switched using only the spin-orbit interaction effect. In other embodiments, the magnetic moment of the first magnetic layer 20 is switched using a combination of effects. For example, the magnetic moment of the first magnetic layer 20 is switched using spin transfer torque as a primary effect that may be assisted by torque induced by the spin-orbit interaction. In other embodiments, the primary switching mechanism is torque induced by the spin-orbit interaction. In such embodiments, another effect including, but not limited to, spin transfer torque, may assist in switching.

The bottom metal layer 10 is a spin orbit active layer that has a strong spin-orbit interaction and that can be used in switching the magnetic moment of the first magnetic layer 20. The bottom metal layer 10 is used in generating a spin-orbit magnetic field H. More specifically, a current driven in a plane through the bottom metal layer 10 and the attendant spin-orbit interaction may result in the spin-orbit magnetic field H. This spin orbit magnetic field H is equivalent to the spin-orbit torque T on magnetization, where $T=-\gamma[M \times H]$ in the first magnetic layer 20. The torque and magnetic field are thus interchangeably referred to as spin-orbit field and spin-orbit torque. This reflects the fact that the spin-orbit interaction is the origin of the spin-orbit torque and spin-orbit field. Spin-orbit torque occurs for a current driven in a plane in the bottom metal layer 10 and a spin-orbit interaction. In contrast, spin transfer torque is due to a perpendicular-to-plane current flowing through the first magnetic layer 20, the nonmagnetic spacer layer 30 and the second magnetic layer 40 (reference layer), that injects spin polarized charge carriers into the first magnetic layer 20. The spin-orbit torque T may rapidly deflect the magnetic moment of the first magnetic layer 20 from its equilibrium state parallel to the easy axis. The spin-orbit torque T may tilt the magnetization of the first magnetic layer 20 considerably faster than conventional STT torque of a similar maximum amplitude. In some embodiments, switching can be completed using spin-orbit torque. In other embodiments, another mechanism such as spin transfer may be used to complete switching. The spin-orbit field/spin-orbit torque generated may thus be used in switching the magnetic moment of the first magnetic layer 20.

In some embodiments, the interaction of the bottom metal layer includes the spin Hall effect. For the spin Hall effect, a current I+ is driven in the plane of the bottom metal layer 10 in a first direction (x-direction) (i.e., current-in-plane, substantially in the x-y plane in FIG. 1). In other words, the current I+ is driven perpendicular to the stacked direction of the films including the bottom metal layer 10 and the first magnetic layer 20 (i.e., perpendicular to the normal to the surface, the z-direction in FIG. 1). Charge carriers having spins of a particular orientation perpendicular to the direction of current and to the normal to the surface (z-direction) accumulate at the surfaces of the bottom metal layer 10. A majority of these spin-polarized carriers diffuse into the first magnetic layer 20 (free layer). This diffusion results in the torque T on the magnetization of the first magnetic layer 20. Since torque on the magnetization is equivalent to the effective magnetic field on the magnetization, as set forth above, the spin accumulation equivalently results in the field H on the first magnetic layer 20. The spin-orbit field for the spin-Hall effect is the cross product of the spin-orbit polarization and the magnetic moment of the first magnetic layer 20. As such, the magnitude of the torque is proportional to the in plane current density I+ and spin polarization of the carriers. The spin-Hall effect may be used in switching the magnetic stacked layer shown in FIG. 1 when the polarization induced by the spin-Hall effect is parallel to the easy axis of the first magnetic layer 20. To obtain the spin-orbit torque T, the current pulse is driven in plane through the bottom metal layer 10. The resulting spin-orbit torque T counteracts damping torque, which results in the switching of the magnetization of the first magnetic layer 20 in an analogous manner to conventional STT switching.

Through a combination of the anomalous Hall effect and the inverse spin Hall effect due to the current I+ passing through the SOT layer, a transverse voltage (Hall voltage) is generated in the SOT layer. The transverse voltage is used as a signal/memory in some embodiments. As shown in FIG. 1, in some embodiments, a voltmeter 90 is connected to portions of the SOT layer 10 extending in a second direction (y-direction) substantially perpendicular (transverse) to the direction of current flow (x-direction). The voltmeter measures the potential on the edges of the SOT layer in the second direction. The measured potential difference indicates the magnetic orientation of magnetic layer 20.

As set forth above, the bottom metal layer 10 is a spin orbit active layer that causes a strong spin orbit interaction with the first magnetic layer 20 (free layer). In some embodiments, the SOT layer 10 includes heavy metals or materials doped by heavy metals. For example, such materials can be selected from A and M doped by B. A includes Y, Zr, Nb, Mo, Tc, Ru, Rh, Pd, Cd, In, Sb, Te, Hf, Ta (including high-resistive amorphous β-Ta), W (including α-W and β-W), Re, Os, Ir, Pt, Au, Hg, Tl, Pb, Bi, Po, At, and/or their combinations; M includes at least one of Al, Ti, V, Cr, Mn, Cu, Zn, Ag, Hf, Ta, W, Re, Pt, Au, Hg, Pb, Si, Ga, GaMn or GaAs, and B includes at least one of V, Cr, Mn, Fe, Co, Ni, P, S, Zn, Ga, Ge, As, Se, Y, Zr, Nb, Mo, Tc, Ru, Rh, Pd, Ag, Cd, In Sb, Te, I, Lu, Hf, Ta, W, Re, Os, Ir, Pt, Au, Hg, Tl, Pb, Bi, Po, At, La, Ce, Pr, Nd, Pm, Sm, Eu, Gd, Tb, Dy, Ho, Er, Tm, Yb. In some embodiments, the SOT layer includes Ir doped Cu and/or Bi doped Cu. The doping is in the range of about 0.1 to about 10 atomic percent. In other embodiments, the SOT layer is one or more of platinum, tungsten, tantalum, and PtMn. A thickness of the bottom metal layer 10 is in a range from about 2 nm to about 20 nm in some embodiments and is in a range from about 5 nm to about 15 nm in other embodiments. In some embodiments, an antiferromagnetic layer made of, for example, IrMn, is disposed between the bottom metal layer 10 and the support layer 5.

In this disclosure, an "element layer" or a "compound layer" generally means that the content of the element or compound is more than 99%.

The first magnetic layer 20 as a data storage layer is a free layer having a magnetic moment that is switchable. In some embodiments, the magnetic layer 20 is ferromagnetic and includes one or more of Fe, Ni, and Co. In some embodiments, the magnetic layer 20 includes $Co_xFe_yB$. The values of x and y may vary in order to obtain different magnetic/crystalline properties. In some embodiments, the magnetic layer 20 has a coercivity greater than about 500 Gauss. In some embodiments, the magnetic layer 20 has a coercivity ranging from greater than about 500 Gauss to about 750 Gauss. In some embodiments, the magnetic layer has a coercivity ranging from greater than about 500 Gauss to about 600 Gauss.

Figure 2:
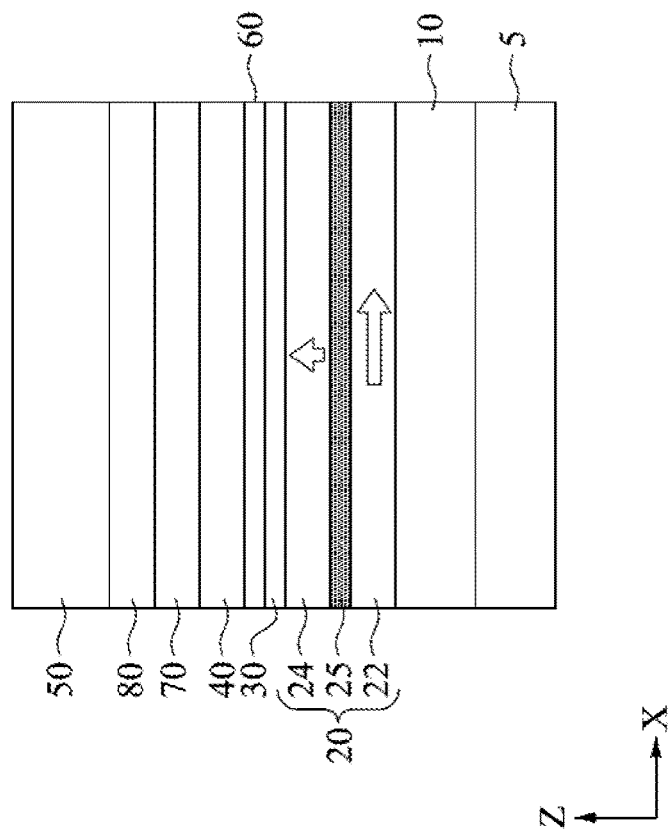
FIG. 2 is a schematic cross sectional view of an MRAM assisted NVM Hall effect device according to an embodiment of the disclosure.

In some embodiments, the first magnetic layer 20 includes a lower magnetic layer 22, a middle layer 25 and an upper magnetic layer 24 as shown in FIG. 2. In some embodiments, the lower magnetic layer 22 is a cobalt iron boron (CoFeB) layer, a cobalt/palladium (CoPd) layer and/or a cobalt iron (CoFe) layer, having a thickness in a range from about 0.6 nm to about 1.2 nm in some embodiments. In certain embodiments, the lower magnetic layer 22 is $Fe_xCo_yB_{1-x-y}$, where $0.50 \leq x \leq 0.70$ and $0.10 \leq y \leq 0.30$. In other embodiments, $0.55 \leq x \leq 0.65$ and $0.15 \leq y \leq 0.25$.

In some embodiments, the upper magnetic layer 24 is a cobalt iron boron (CoFeB) layer, a cobalt/palladium (CoPd) layer and/or a cobalt iron (CoFe) layer, having a thickness in a range from about 1.0 nm to about 3.0 nm, or a NiFe layer having a thickness in a range from about 0.4 nm to about 3.0 nm in some embodiments. In certain embodiments, the upper magnetic layer 24 is $Fe_xCo_yB_{1-x-y}$, where $0.50 \leq x \leq 0.70$ and $0.10 \leq y \leq 0.30$. In other embodiments, $0.55 \leq x \leq 0.65$ and $0.15 \leq y \leq 0.25$. In some embodiments, the upper magnetic layer 24 is made of the same material as the lower magnetic layer 22. In other embodiments, the upper magnetic layer 22 is made of a different material than the lower magnetic layer 22.

The middle non-magnetic layer 25 is a coupling layer and made of one or more of W, Mo, Pt and Ru and alloy thereof, in some embodiments. The thickness of the middle non-magnetic layer 25 is in a range from about 0.2 nm to about 0.5 nm in some embodiments. Through the coupling material of the middle non-magnetic layer 25, the lower magnetic layer 22 and the upper magnetic layer 24 of the first magnetic layer 20 are coupled. Such a coupling would break the symmetry and hence field free switching is possible. As shown in FIG. 2, the direction of magnetic field of the lower magnetic layer 22 is substantially horizontal (perpendicular to the film stack direction), while the direction of magnetic field of the upper magnetic layer 24 is substantially vertical (parallel to the film stack direction), in some embodiments. In some embodiments, the magnetic field direction of, for example, the lower magnetic layer 22, may tilt at a small angle (e.g., 1 to 30 degrees), which may cause a degradation of a tunneling magnetoresistance (TMR) ratio. In some embodiments, the TMR ratio can be optimized by controlling the thickness of at least one of the lower magnetic layer 22 and the upper magnetic layer 24.

Figure 3:
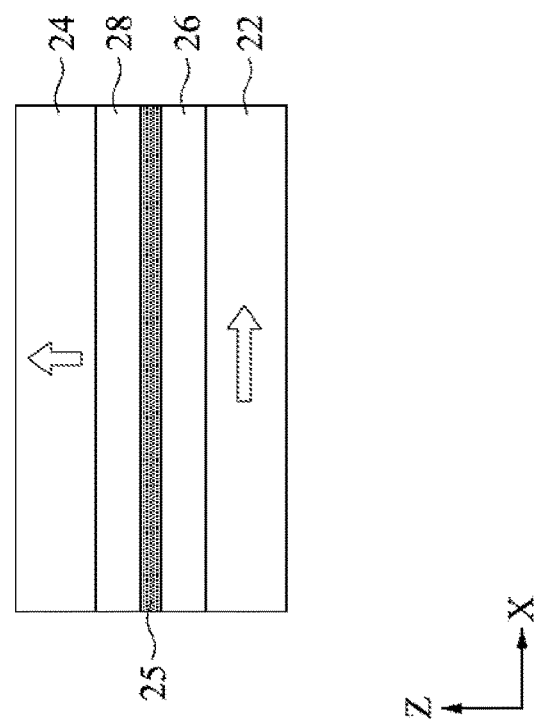
FIG. 3 is a schematic cross sectional view of an MRAM assisted NVM Hall effect device according to an embodiment of the disclosure.

In some embodiments, as shown in FIG. 3, interfacial layers 26 and 28 are disposed between the lower magnetic layer 22 and the middle non-magnetic layer 25 and between the middle non-magnetic layer 25 and the upper magnetic layer 24, respectively. In some embodiments, the interfacial layers 26 and 28 are made of FeB. The thickness of the interfacial layers 26 and 28 is in a range from about 0.5 nm to about 2.0 nm in some embodiments. When the middle non-magnetic layer 25 is disposed between the lower magnetic layer 22 and the upper magnetic layer 24 (in other words, the middle non-magnetic layer 25 is inserted in the first magnetic layer 20), a dead layer may be observed at the interface between the middle non-magnetic layer 25 and the lower magnetic layer 22 and/or the upper magnetic layer 24, which may weaken perpendicular magnetic anisotropy (PMA). By inserting the interfacial layers 26 and 28, it is possible to suppress the dead layer, and maintain or improve the PMA.

The nonmagnetic metal oxide layer 30 is made of a dielectric material. In some embodiments, the nonmagnetic metal oxide layer 30 includes a crystalline or an amorphous magnesium oxide (MgO) layer. In other embodiments, the nonmagnetic metal oxide layer 30 is made of aluminum oxide. In some embodiments, the metal oxide layer 30 has a thickness in a range from about 0.3 nm to about 2 nm, and in other embodiments, the thickness of the nonmagnetic layer 30 is in a range from about 0.5 nm to about 1.0 nm. The metal oxide layer 30 is material that is needed for the perpendicular magnetic anisotropy of the magnetic layer 20 in some embodiments.

In some embodiments, the device includes a second magnetic layer 40. The second magnetic layer 40 is a reference layer of which the magnetic moment does not change. In some embodiments, the second magnetic layer 40 is made of the same material as the first magnetic layer 20 as set forth above. In some embodiments, the second magnetic layer 40 includes multiple layers of magnetic materials. In some embodiments, the second magnetic layer 40 includes a multilayer structure of cobalt (Co) and platinum (Pt). In some embodiments, a thickness of the second magnetic layer 40 is in a range from about 0.2 nm to about 1.0 nm and is in a range from about 0.3 nm to about 0.5 nm in other embodiments.

In some embodiments, the second magnetic layer 40 is a multilayer including a synthetic antiferromagnetic layer having ferromagnetic layers separated by nonmagnetic layer, such as Ru. In some embodiments, a pinning layer, such as an antiferromagnetic layer that fixes the magnetic moment of the second magnetic layer 40 in place is disposed over the second magnetic layer 40 with a Ru layer interposed therebetween. The first and second magnetic layers are crystalline in some embodiments.

In some embodiments, the device includes a top conductive layer 50 as an electrode. The top conductive layer 50 includes one or more layers of Ta, Ru, Au, Cr, Pt, Cu, Ni, W, and Al.

The support layer 5 is made of a dielectric material, such as silicon oxide, silicon oxynitride, silicon nitride, aluminum oxide, magnesium oxide or any other suitable material. In some embodiments, the support layer 5 is a shallow trench isolation layer, an interlayer dielectric (ILD) layer or an inter-metal dielectric (IMD) layer in a semiconductor device.

Further, as shown in FIG. 2, in some embodiments, an intermediate metal layer 60 is disposed between the non-magnetic metal oxide layer 30 and the second magnetic layer 40. In some embodiments, the intermediate metal layer 60 is made of a nonmagnetic material. In certain embodiments, the intermediate metal layer 60 is made of Mg. A thickness of the intermediate metal layer 60 is in a range from about 0.1 nm to about 0.6 nm in some embodiments and is in a range from about 0.2 nm to about 0.5 nm in other embodiments. In other embodiments, no intermediate metal layer is used.

In some embodiments, an antiferromagnetic layer 70 is formed over the second magnetic layer, and a third magnetic layer 80 is formed over the antiferromagnetic layer 70, as shown in FIG. 2. The anti-ferromagnetic layer 70 helps to fix the magnetic moment of the second magnetic layer 40. In some embodiments, the antiferromagnetic layer 70 includes ruthenium (Ru) or any other suitable antiferromagnetic material. In some embodiments, the thickness of the antiferromagnetic layer 70 is in a range from about 0.2 nm to about 0.8 nm.

The third magnetic layer 80 includes one or more layers of magnetic materials. In some embodiments, the third magnetic layer 80 includes one or more of cobalt, iron, nickel, and platinum. In some embodiments, the material of the third magnetic layer 80 is the same as or different from the material of the second magnetic layer 40. In certain embodiments, the third magnetic layer 80 is a CoPt layer. A thickness of the third magnetic layer is in a range from about 0.5 nm to about 1.5 nm in some embodiments and is in a range from about 0.7 nm to about 1.2 nm in other embodiments.

Each of the layers shown in FIGS. 1-3 can be formed by suitable film formation methods, which include physical vapor deposition (PVD) including sputtering; molecular beam epitaxy (MBE); pulsed laser deposition (PLD); atomic layer deposition (ALD); electron beam (e-beam) epitaxy; chemical vapor deposition (CVD); or derivative CVD processes further including low pressure CVD (LPCVD), ultra-high vacuum CVD (UHVCVD), reduced pressure CVD (RPCVD); electro plating, or any combinations thereof.

In some embodiments, a film stack is formed by the aforementioned film formation operations, and after the film stacks are formed, a patterning operation including one or more lithography and etching operations is performed on the film stack to form a SOT cell as shown in FIG. 1.

In some embodiments, a bottom metal layer 10 is formed over a support layer 5. The bottom metal layer 10 can be formed by PVD, CVD, ALD, or any other suitable film formation methods. Then, a first magnetic layer 20 is formed by using PVD, CVD, ALD, or any other suitable film formation methods. As set forth above, the first magnetic layer 20 includes the lower magnetic layer 22, the middle non-magnetic layer 25 and the upper magnetic layer 24. In some embodiments, the first magnetic layer 20 further includes the interfacial layers 26 and 28. These layers are sequentially formed over the bottom metal layer 10. Further, the remaining layers are sequentially formed over the first magnetic layer 20.

Figure 4:
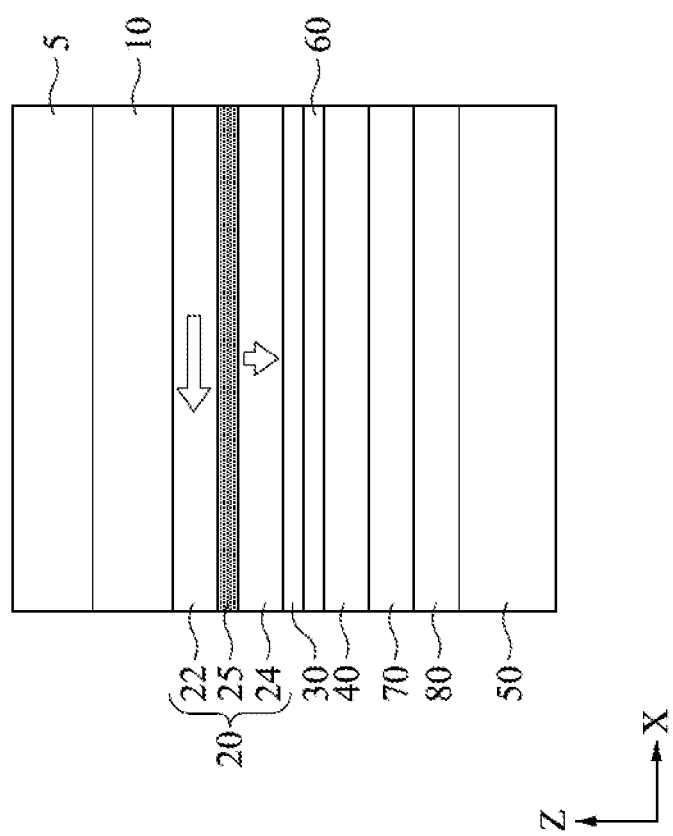
FIG. 4 is a schematic cross sectional view of an MRAM assisted NVM Hall effect device according to an embodiment of the disclosure.

FIG. 4 is a schematic cross sectional view of a SOT MRAM cell according to an embodiment of the present disclosure. In this embodiment, the order of the stacked films are reversed.

Embodiments of the present disclosure combine a Hall sensor with magnetic random access memory (MRAM) to provide a non-volatile memory (NVM) device. Unlike a Hall sensor, which requires an external magnetic field, embodiments of the present disclosure do not require an external magnetic field. The present disclosure provides a less complicated non-volatile Hall effect device than conventional Hall effect devices.

Figure 5:
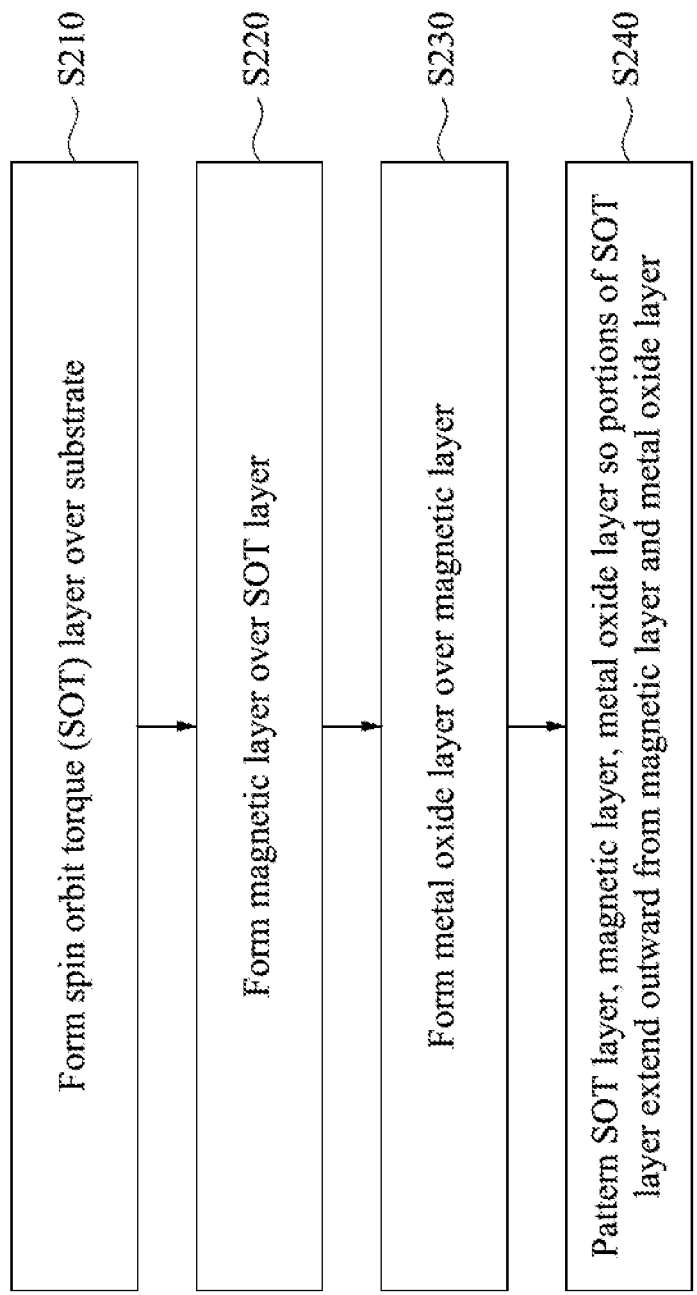
FIG. 5 is a flowchart illustrating a method of manufacturing an MRAM assisted NVM Hall effect device according to an embodiment of the disclosure.

A method of fabricating an MRAM assisted NVM Hall effect device is described with reference to FIGS. 5 to 9C. FIG. 5 is a flowchart illustrating a method of manufacturing an MRAM assisted NVM Hall effect device according to an embodiment of the disclosure. In operation S210, a spin orbit torque layer 10 is formed over a substrate 5. Then a magnetic layer 20 is formed over the spin orbit torque layer 10 in operation S220. A metal oxide layer 30 is subsequently formed over the magnetic layer in operation S230. In operation S240, the spin orbit torque layer 10, magnetic layer 20, and metal oxide layer 30 are patterned so that portions of the spin orbit torque layer 10 extend outward from the magnetic layer 20 and the metal oxide layer 30 on opposing sides of a first direction and opposing sides of a second direction in plan view, wherein the second direction is perpendicular to the first direction.

Figure 6A:
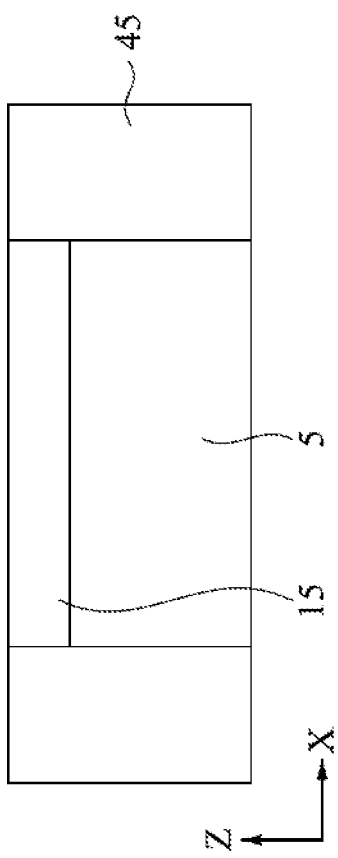
FIGS. 6A, 6B, 6C, and 6D show various stages of a manufacturing operation for an MRAM assisted NVM Hall effect device according to an embodiment of the present disclosure.

The method of manufacturing an MRAM assisted device according to some embodiments of the disclosure will be further described in reference to FIGS. 6A to 9C. As shown in FIG. 6A, an insulating layer 15 is formed over a semiconductor substrate 5 in some embodiments. In some embodiments, the semiconductor substrate 5 is a silicon substrate. In some embodiments, the substrate 5 is a silicon wafer and the insulating layer 15 is a silicon oxide layer. In some embodiments, the insulating layer 15 is formed by a CVD or PVD operation, in other embodiments, the insulating layer is formed by thermally oxidizing the substrate 5.

Figure 6B:
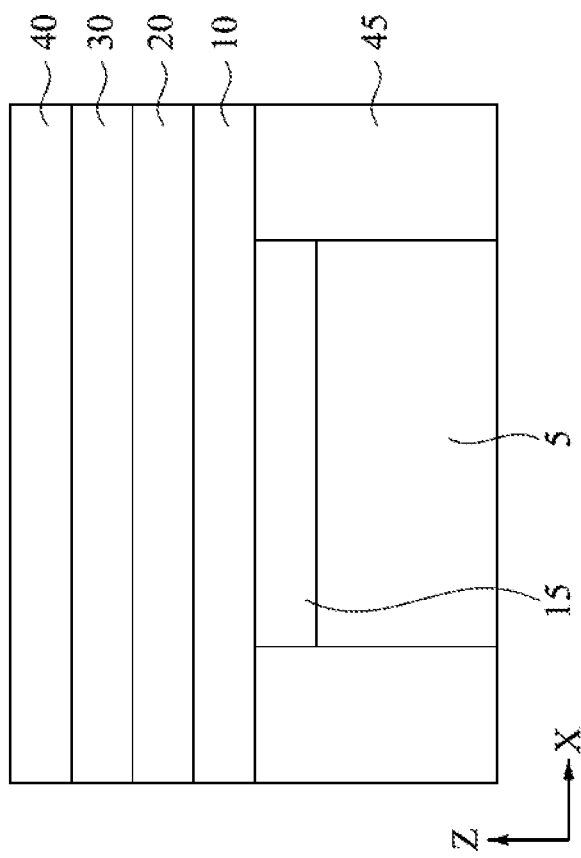

In some embodiments, lower electrodes 45 are formed along a portion of the substrate 5 and insulating layer 15, as shown in FIG. 6B. The insulating layer 15 is formed by photolithographic and etching operations, followed by depositing an electrically conductive material in some embodiments. In some embodiments, excess electrically conductive material is removed by a polishing or etchback operation. In some embodiments, a chemical mechanical polishing (CMP) operation is performed to planarize the upper surface of the lower electrodes 45 and the insulating layer 15 or substrate 5. In some embodiments, the electrically conductive material is selected from Ta, Ru, Au, Cr, Pt, W, Cu, Ni, Al, and alloys thereof.

Figure 6C:
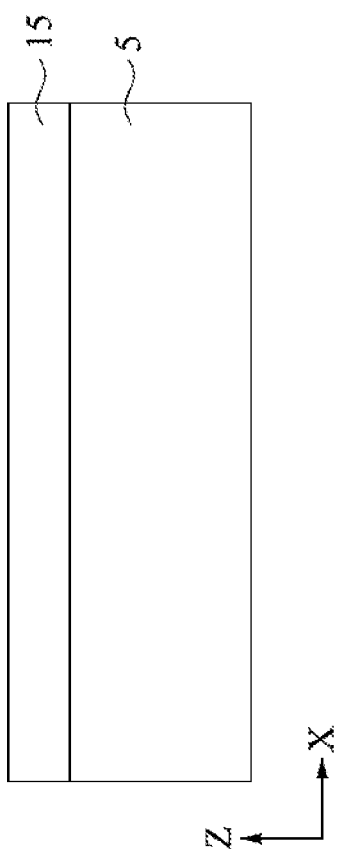

A SOT layer 10 is then formed over the insulating layer 15 and lower electrodes 45 in some embodiments, as shown in FIG. 6C. In some embodiments, the SOT layer 10 is formed of one or more of platinum, tungsten, tantalum, and PtMn.

Figure 6D:
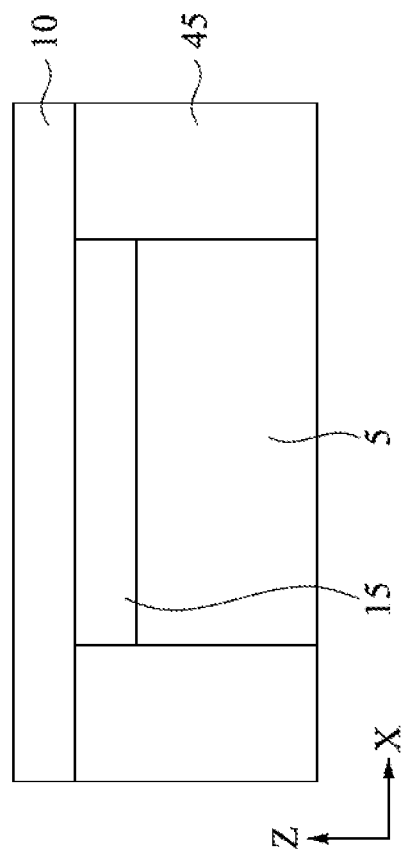

A magnetic layer 20 is formed over the SOT layer 10, and a metal oxide layer 30 is formed over the magnetic layer 20, as shown in FIG. 6D. In some embodiments, the magnetic layer is $Co_xFe_yB$ and the metal oxide layer 30 is MgO to form a layer stack. In some embodiments, the layer stack includes one or more additional magnetic layer 40 formed over the metal oxide layer 30 to modify the magnetic properties (Hc) of the magnetic layer 20.

Figure 7B:
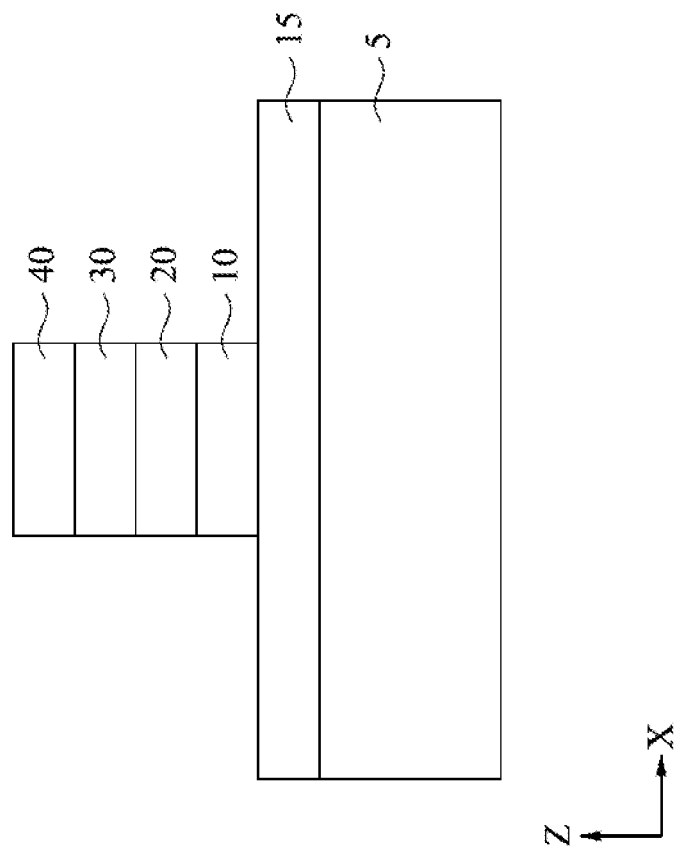
FIGS. 7A, 7B, and 7C show one of the various stages of a manufacturing operation for an MRAM assisted NVM Hall effect device according to an embodiment of the present disclosure.
Figure 7A:
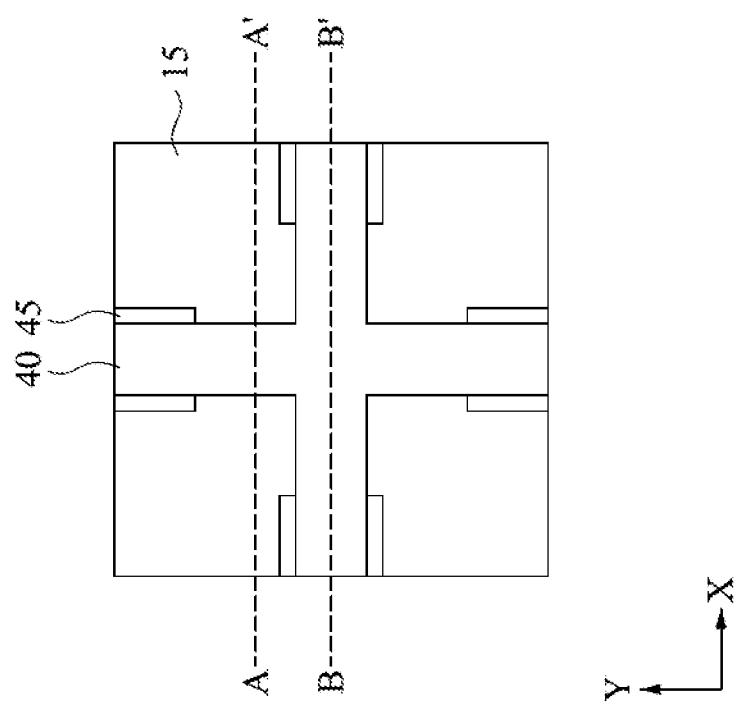
Figure 7C:
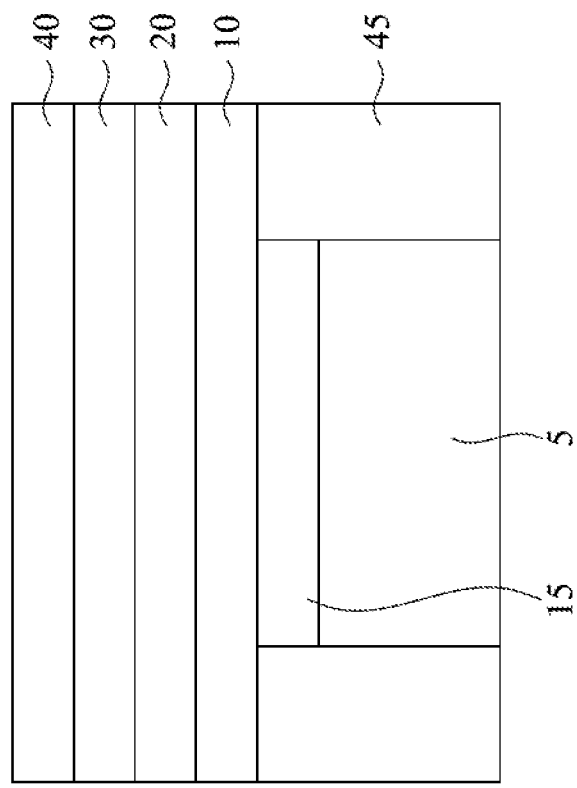

The layer stack is subsequently patterned, as shown in FIGS. 7A, 7B, and 7C. FIG. 7A is a plan view, FIG. 7B is a cross-sectional view taken along line A-A' in FIG. 7A, and FIG. 7C is a cross-sectional view taken along line B-B' in FIG. 7A. As shown, the second magnetic layer 40, metal oxide layer 30, first magnetic layer 20, and SOT layer 5 are patterned to form a cross-shape, though the present disclosure is not limited to this shape. The layer stack is patterned using photolithographic and etching operations.

Figure 8B:
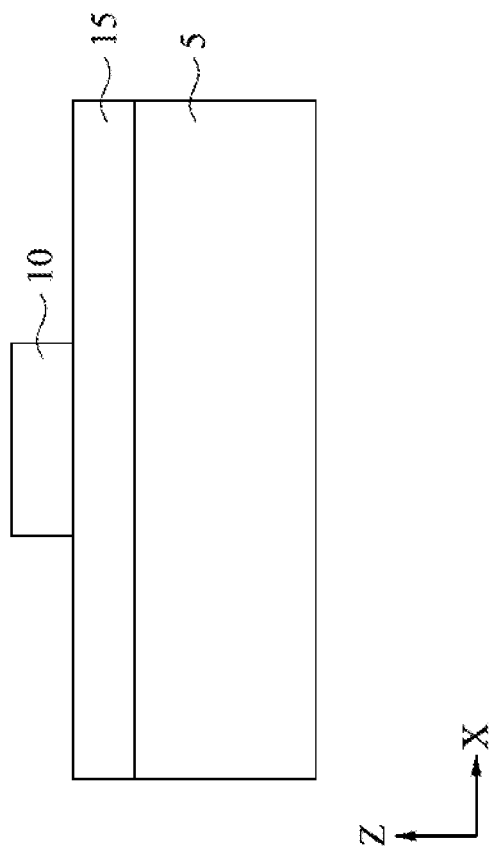
Figure 8A:
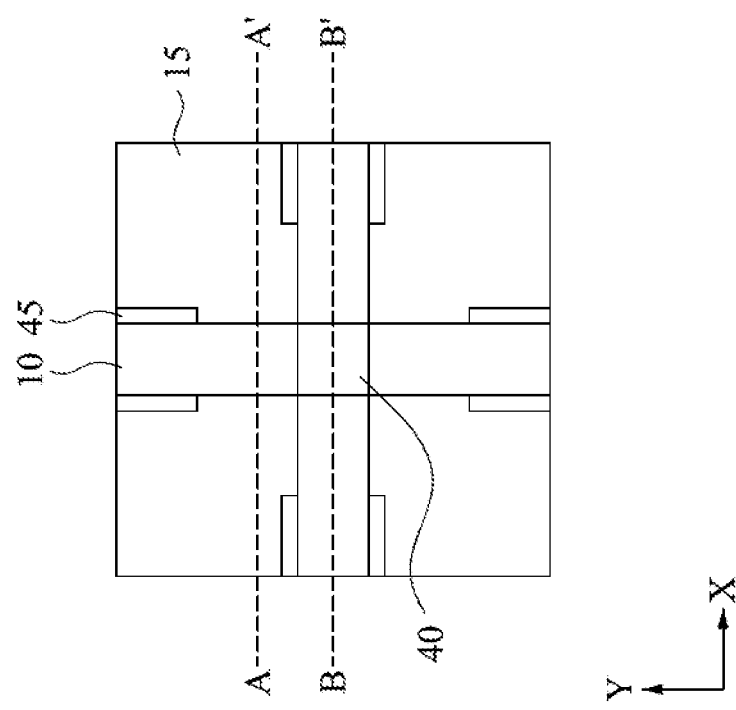

Next, the second magnetic layer 40, metal oxide layer 30 and the first magnetic layer 20 are further patterned to reduce their widths relative to the SOT layer 10, as shown in FIGS. 8A, 8B, and 8C. FIG. 8A is a plan view, FIG. 8B is a cross-sectional view taken along line A-A', and FIG. 8C is a cross-sectional view taken along line B-B' in FIG. 8A. The second magnetic layer 40, metal oxide layer 30, and first magnetic layer 20 are further patterned using photolithographic and etching operations. The optional second magnetic layer 40, metal oxide layer 30, and first magnetic layer 20 are patterned so that these patterned layers are located over a central portion of the cross-shaped SOT layer 10. In other words, opposing sides of the SOT layer 10 extend outwards from the edges of first magnetic layer 20, metal oxide layer 30, and optional second magnetic layer 40 in substantially perpendicular directions. The lower electrodes 45 are electrically connected to the four ends of the cross-shaped SOT layer 10 in some embodiments.

Figure 9B:
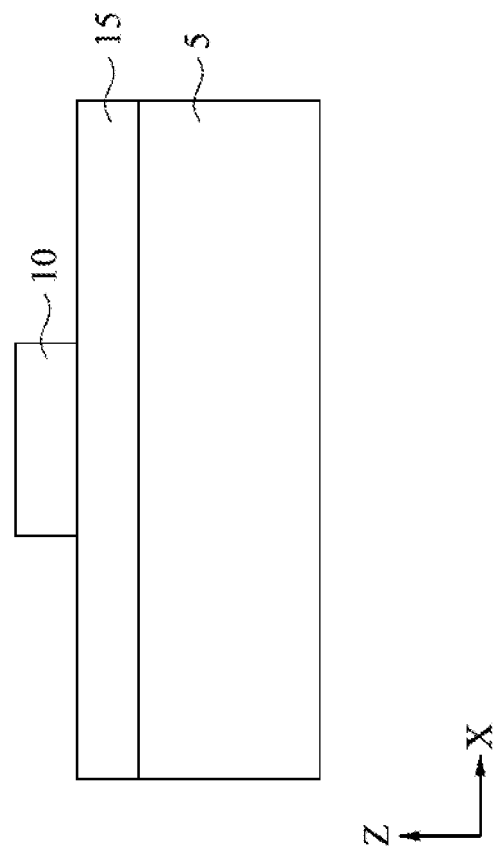
FIGS. 9A, 9B, and 9C show one of the various stages of a manufacturing operation for an MRAM assisted NVM Hall effect device according to an embodiment of the present disclosure.
Figure 9A:
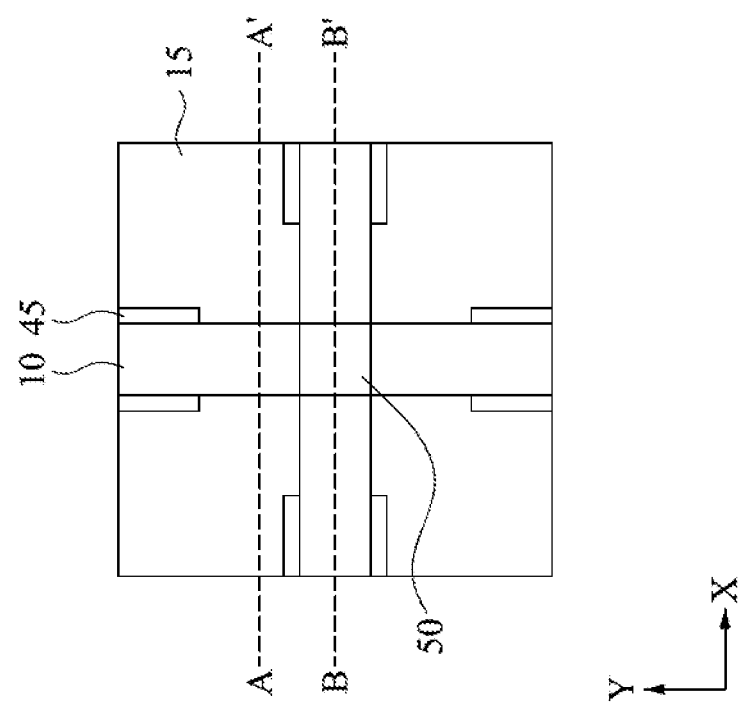
Figure 9C:
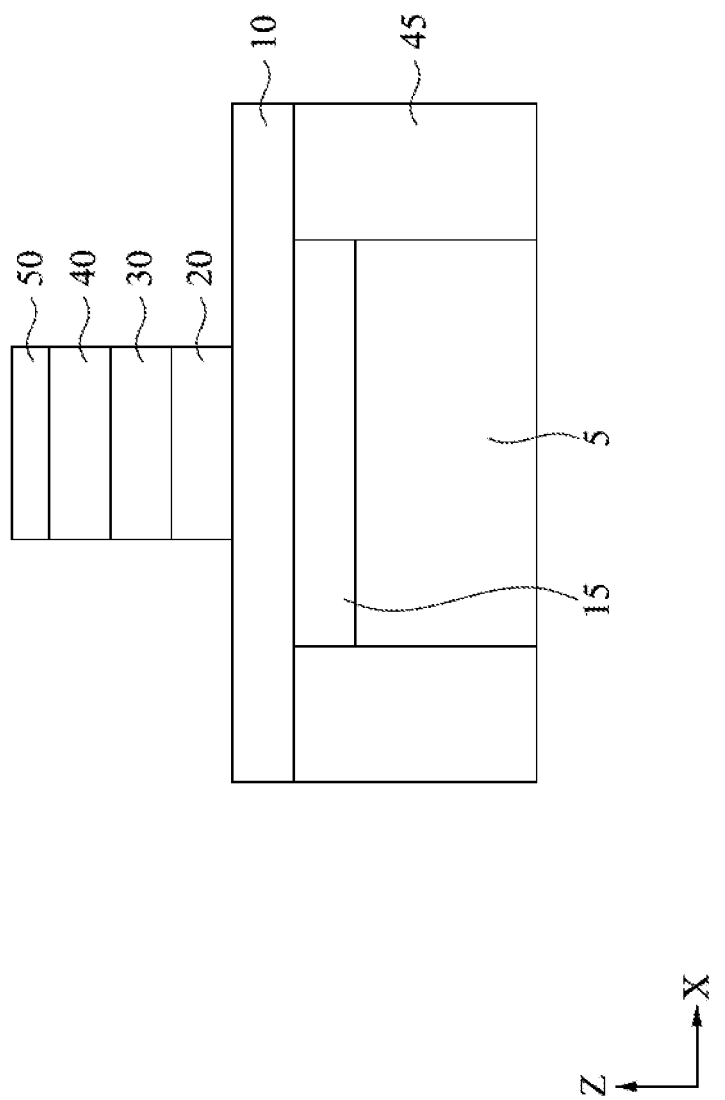

An upper contact 50 including an electrically conductive material is subsequently formed on the MRAM assisted device as shown in FIGS. 9A, 9B, and 9C in some embodiments. FIG. 9A is a plan view, FIG. 9B is a cross-sectional view taken along line A-A' in FIG. 9A, and FIG. 9C is a cross-sectional view taken along line B-B'. The upper contact can be formed using photolithographic and material deposition techniques.

Figure 10A:
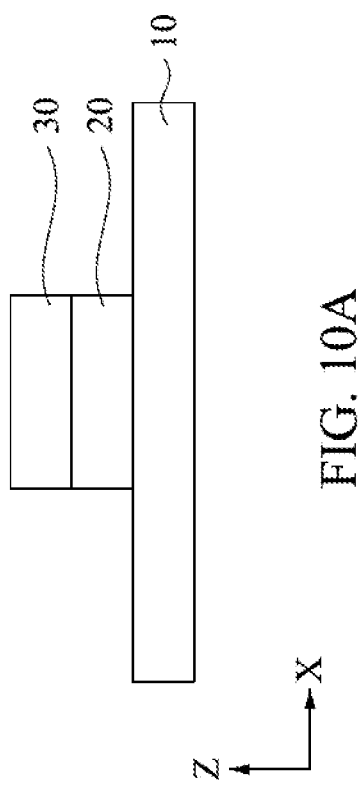
FIGS. 10A and 10B show an MRAM assisted NVM Hall effect device according to an embodiment of the present disclosure.
Figure 10B:
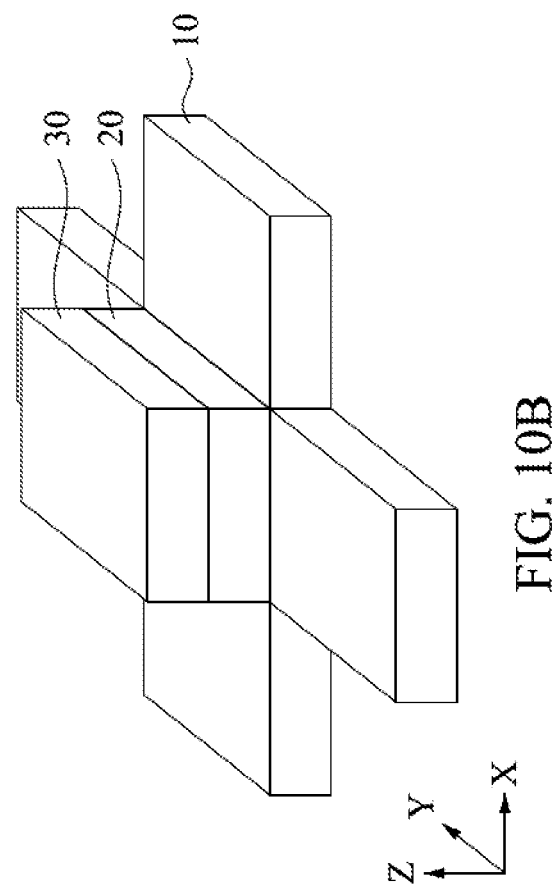

FIG. 10A is a cross sectional view of an MRAM assisted NVM Hall effect device according to embodiments of the disclosure, and FIG. 10B is a schematic isometric view of the device, not including the substrate, showing the device's operation before a write current is applied.

Figure 11:
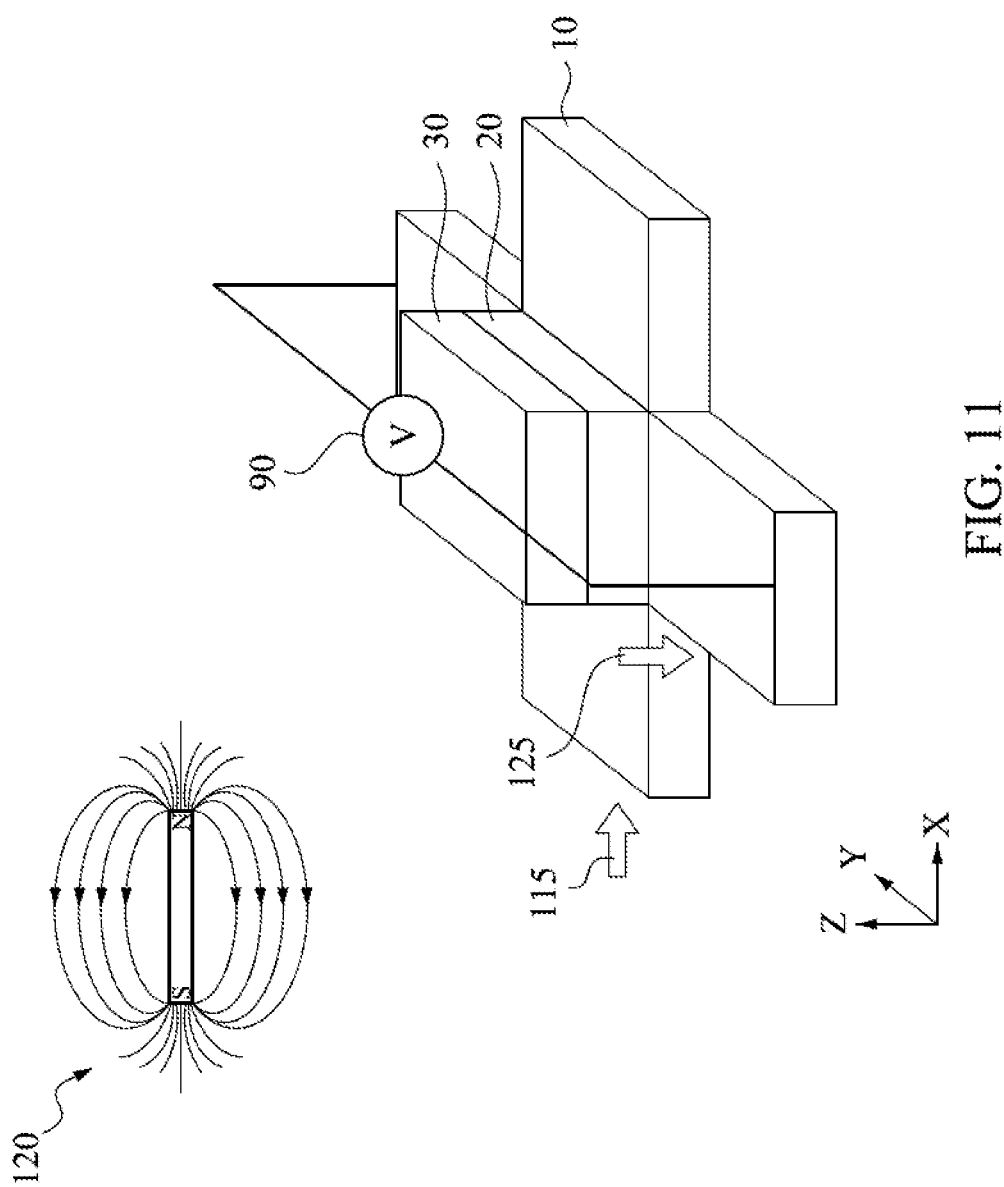
FIG. 11 shows the operation of an MRAM assisted NVM Hall effect device according to an embodiment of the present disclosure.

FIG. 11 is a schematic isometric view of the MRAM assisted NVM Hall effect device of FIGS. 10A and 10B, showing the device's operation when the magnetic orientation is initialized. The initial magnetic orientation is indicated by the downward pointing arrow 125. The initial magnetic orientation is set by either applying a magnetic field 120 ranging from about 100 Oe (oersted) to about 2000 Oe or a high current 115. In some embodiments, the magnetic field ranges from about 200 Oe to about 1000 Oe. In some embodiments, the applied current 115 is applied to the SOT layer 10 at a current density of greater than $1\times10^{11}$ A/m² applied along the x-direction. In some embodiments, the current 115 is a DC pulse applied for a duration of at least 1 ns. In some embodiments, the DC pulse 15 is applied for a duration of 1 ns to 1 s. In some embodiments, the DC pulse is applied for a duration of 1 ns to 1 ms. The transverse voltage is measured across the y-direction by a voltmeter 90 connected to ends of the SOT layer 10 to determine the magnetic orientation of the magnetic layer 20.

Figure 12A:
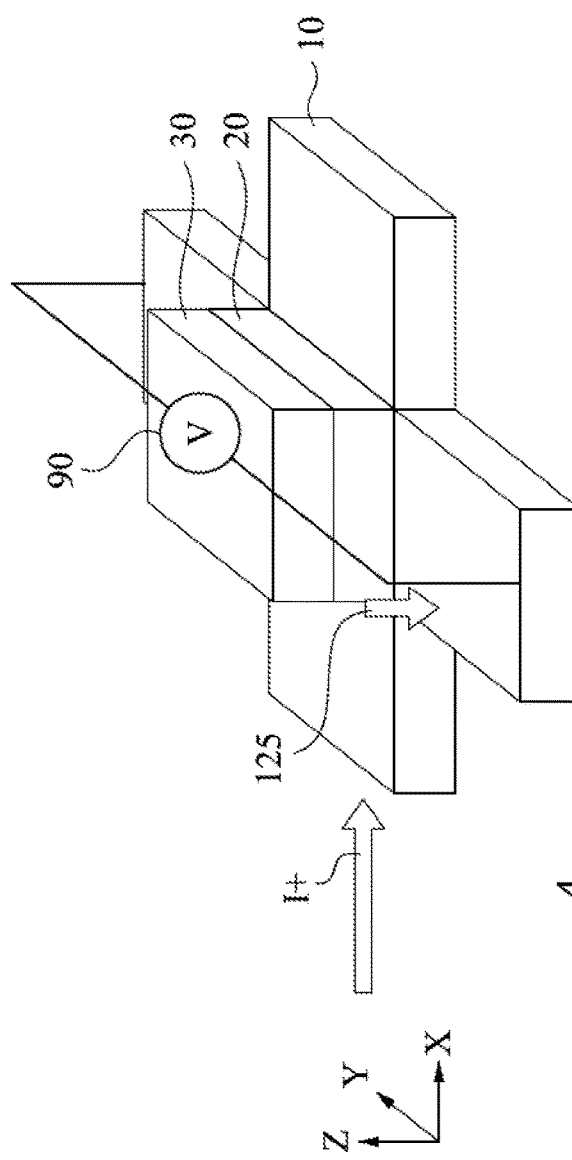
FIGS. 12A, 12B, and 12C show the operation of an MRAM assisted NVM Hall effect device according to an embodiment of the present disclosure.
Figure 12C:
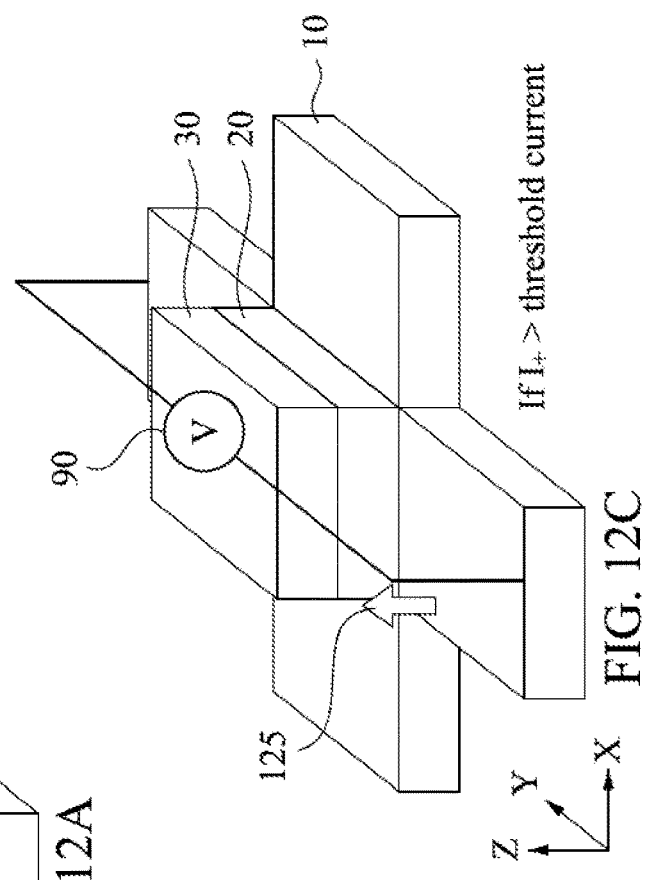
Figure 12B:
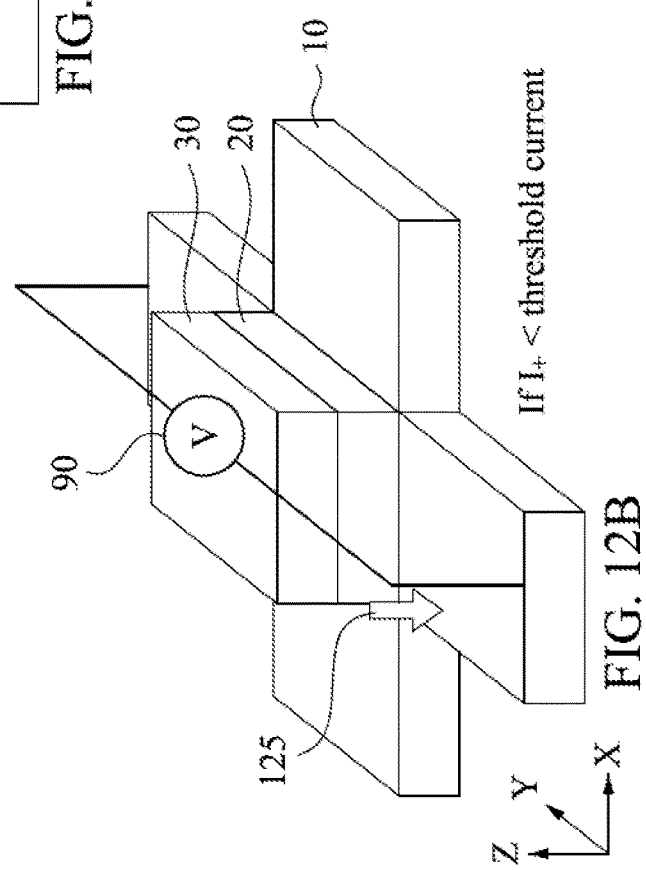

FIGS. 12A-12C are schematic isometric views of the MRAM assisted NVM Hall effect device. FIG. 12A is a schematic view showing the application of a write current I+ to the MRAM assisted device of FIG. 11. The write current I+ is applied to the SOT layer 10 along the x-direction and transverse voltage is measured by the voltmeter 90 across the y-direction of portions of the SOT layer 10 extending beyond the magnetic layer 20 along the y-direction. As shown in FIG. 12B, if the write current I+ is less than the threshold current of the particular device the magnetic orientation 125 of the device does not change from the initial state, while in FIG. 12C when the write current is greater than the threshold current and the magnetic orientation of the device is flipped. Whether the magnetic orientation 125 has changed is verified by observing the voltage change using the voltmeter 90. The magnetic orientation depends on the current. In some embodiments of SOT-MRAMs the magnetic orientation does not flip back from a second magnetic to a first magnetic orientation upon the application of additional current pulses greater than the threshold current in the same current direction.

In some embodiments, the magnetic orientation of the magnetic layer is switched by applying a current density of at least about $1\times10^{11}$ A/m² to the SOT layer. In some embodiments the current density applied to the SOT layer ranges from about $1\times10^{11}$ A/m² to about $1\times10^{12}$ A/m². The invention is not limited to these current densities, as the value of the current density to change the magnetic orientation depends on the properties of the materials of the device components.

In some embodiments, a plurality of MRAM assisted devices (or cells) are arranged in an array. Depending on the processing temperature of the plurality of MRAM assisted devices and the thickness of the individual layers of the MRAM assisted device, including the tunneling barrier layer, the magnetic properties of the MRAM assisted devices varies among the individual devices (cells) in the array. For example, a particular write current close to a threshold voltage applied to a line or array of devices may cause some devices to flip their magnetic orientation while other devices in array do not switch. Whether a particular device changes its magnetic orientation is random and is based on localized differences in the layers of each device. The coercivity is randomly distributed within a certain range. Thus, some devices may change magnetic orientation at a particular write current while other devices do not change their magnetic orientation.

Figure 13:
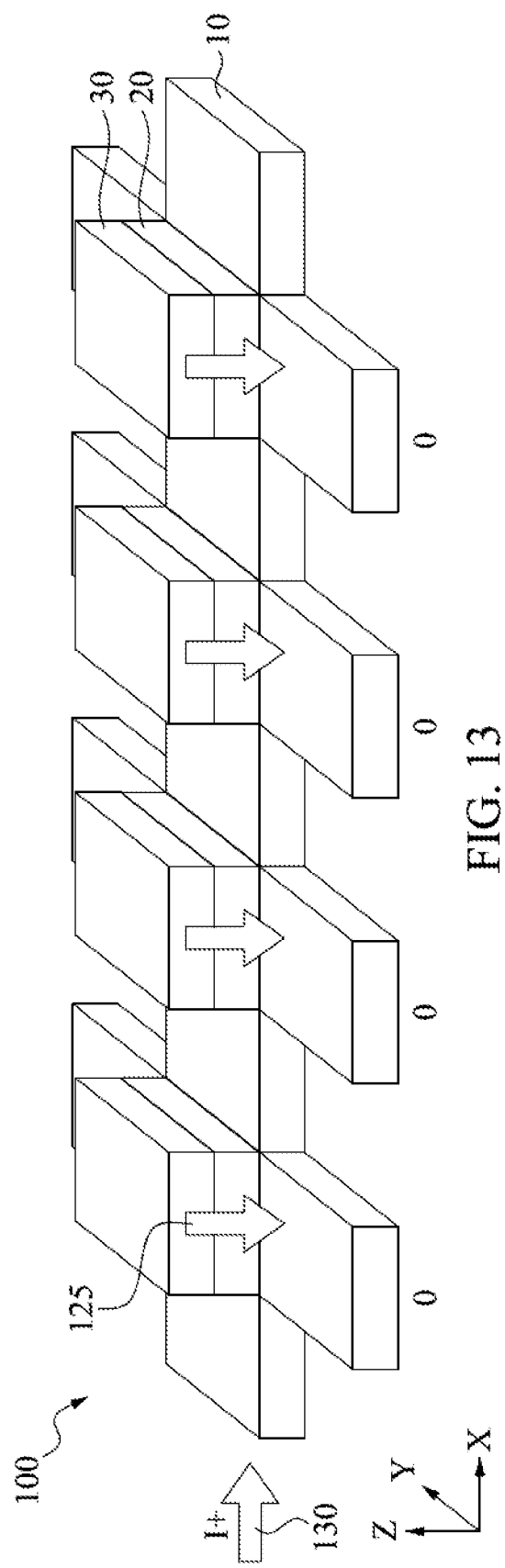
FIG. 13 shows an MRAM assisted non-volatile physically unclonable device according to an embodiment of the disclosure.
Figure 14:
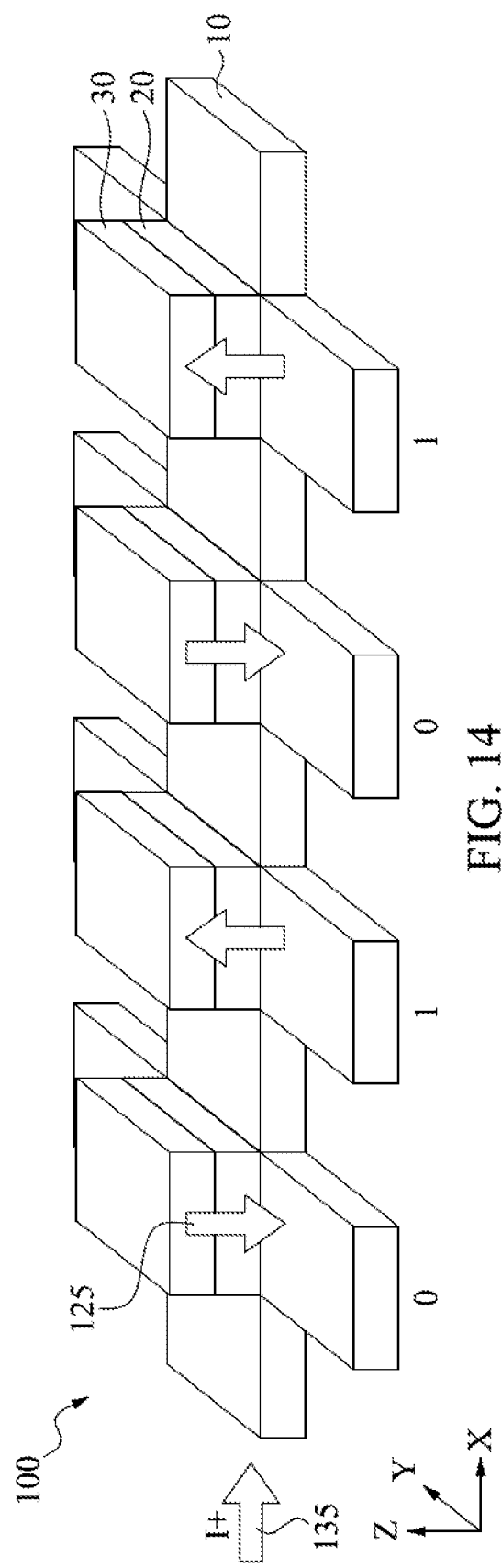
FIG. 14 shows the random flipping of an MRAM assisted non-volatile physically unclonable device when a write current is applied.

This naturally occurring randomness in the coercivity allows a plurality of MRAM assisted devices according to the present disclosure to be used in physical unclonable function (PUF) applications. In an embodiment, the devices in an array 100 are initialized (set to 0) by applying a current I+ 130 above the threshold current of each of the cells to the SOT layer 10. In some embodiments, an external magnetic field is used to initialize the plurality of devices in the array. As shown in FIG. 13, the magnetic orientation 125 of each individual device is set in the same direction. Then, in FIG. 14, a write current I+ 135 close to the threshold current is applied to the array. Because the write current I+ 135 applied to the devices is close to the threshold current, some devices will flip from 0 to 1, while others remain at 0 state, as shown in FIG. 14. Which particular device flips in an array is random and non-predictable. Thus, the devices are physically unclonable. The randomness is a result of the manufacturing process in some embodiments. In some embodiments, the physically unclonable function is used to create a random pattern in the array 100. In some embodiments, this random pattern is used as an electronic identification. In some embodiments, these random patterns can be used as a security feature, such as a magnetic strip on a credit card.

In some embodiments, the write current I+ 135 is varied to vary the number of devices that change magnetic orientation. Because the write current I+ 135 is close to the threshold current, reducing the write current I+ 135 applied to spin orbit torque layer 10 will reduce the number of devices in which the magnetic orientation of the magnetic layer 20 is changed. On the other hand, increasing the write current will increase the number of devices in which the magnetic orientation of the magnetic layer 20 is changed.

In some embodiments, the array is a linear array of cells 100, as illustrated in FIGS. 13 and 14. The cells are connected to each other by the spin orbit torque layer 10 and the linear array extends along the direction of the write current I+ flow. The linear array of cells 100, is formed in some embodiments by material deposition, photolithographic, and etching operations as described herein. In other embodiments, a plurality of linear arrays of MRAM assisted cells are arranged to form a two-dimensional array having a plurality of rows or columns of MRAM assisted cells, as seen in plan view.

Figure 15:
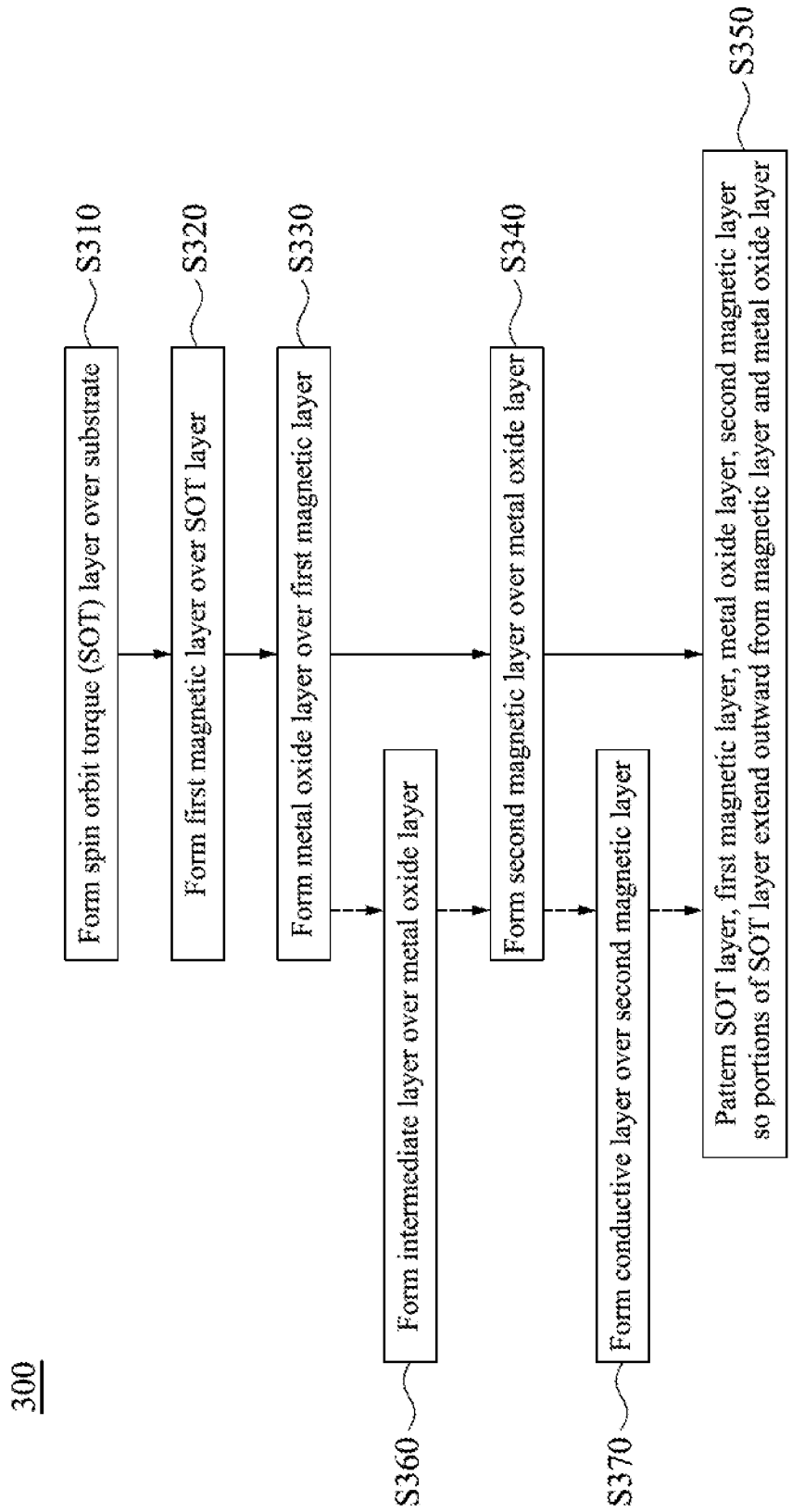
FIG. 15 is a flowchart illustrating a method of manufacturing an MRAM assisted device according to an embodiment of the disclosure.

FIG. 15 is a flowchart illustrating a method of manufacturing an MRAM assisted device according to an embodiment of the disclosure. In operation S310, a spin orbit torque layer 10 is formed over a substrate 5. A first magnetic layer 20 is formed over the spin orbit torque layer 10 in operation S320. Then, a metal oxide layer 30 is formed over the magnetic layer 20 in operation S330. A second magnetic layer 40 is subsequently formed over the metal oxide layer 30 in operation S340 in some embodiments. In operation S350, the spin orbit torque layer 10, first magnetic layer 20, metal oxide layer 30, and the optional second magnetic layer 40 are patterned so that portions of the spin orbit torque layer 10 extend outward from the first magnetic layer 20, the metal oxide layer 30, and the second magnetic layer 40 on opposing sides of a first direction and opposing sides of a second direction in plan view, wherein the second direction is perpendicular to the first direction. In some embodiments, in operation S360, an intermediate layer 60 is formed after forming the metal oxide layer 30 and before forming the second magnetic layer 40. In some embodiments, a conductive layer 50 is formed over the second magnetic layer 40 in operation S370.

Figure 16:
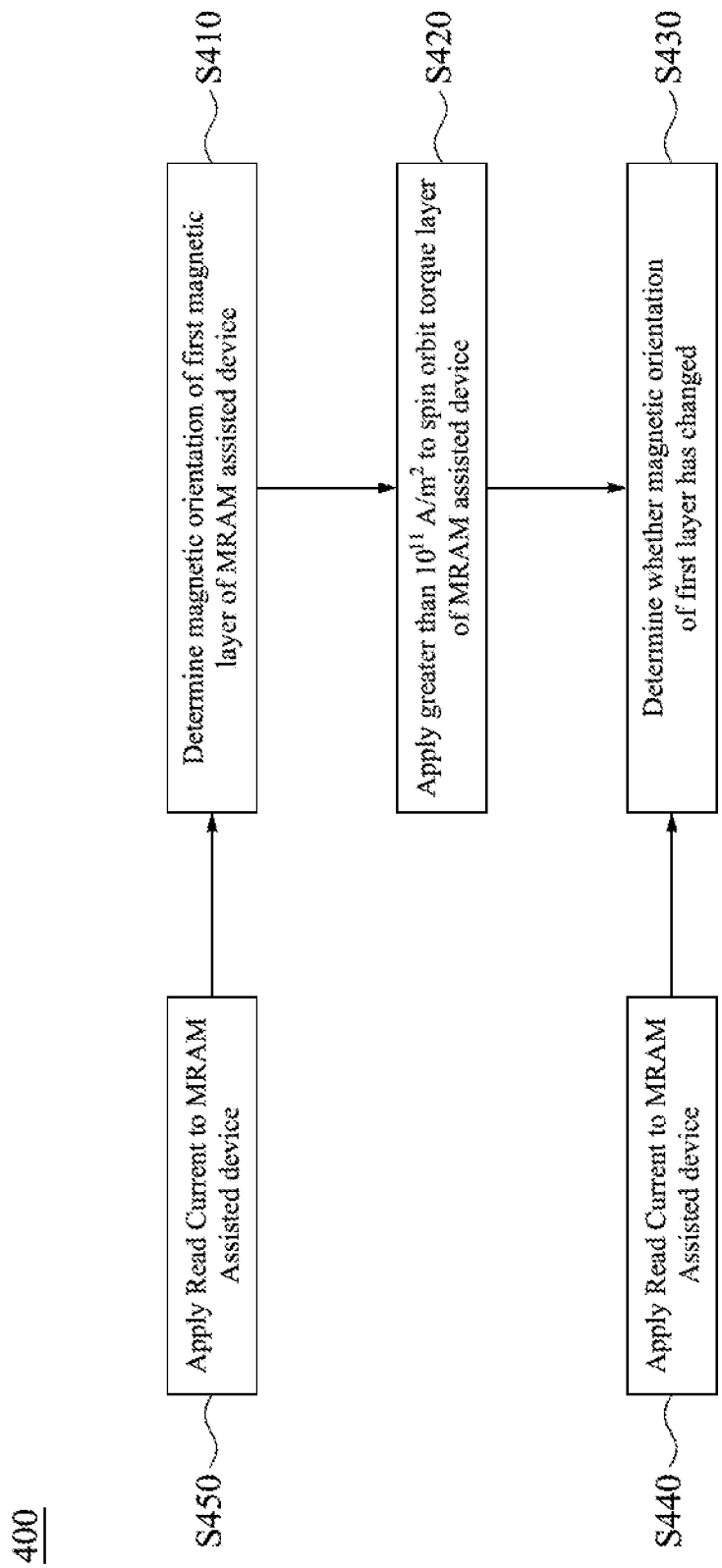
FIG. 16 is a flowchart illustrating a method of writing to an MRAM assisted device according to an embodiment of the disclosure.

FIG. 16 is a flowchart illustrating a method of writing to an MRAM assisted device according to an embodiment of the disclosure. In operation S410, a magnetic orientation of a first magnetic layer of the MRAM assisted device is determined. The device includes a spin orbit torque (SOT) layer 10 disposed over a substrate 5. A first magnetic layer 20 is disposed over the spin orbit torque layer 10, and a metal oxide layer 30 is disposed over the first magnetic layer 20. In some embodiments, the magnetic orientation is determined by measuring the transverse voltage across the portions of the SOT layer extending from the magnetic layer of the device in directions substantially perpendicular to the direction of current flow in the SOT layer. In operation S420, a current density of at least $10^{11}$ A/m$^2$ is applied to the spin orbit torque layer 10. In some embodiments, whether the magnetic orientation of the first magnetic layer 20 has changed after the applying a current density of at least $10^{11}$ A/m$^2$ to a spin orbit torque layer is determined in operation S430. In some embodiments, whether the magnetic orientation of the first magnetic layer 20 has changed is determined by applying a read current to the SOT layer of the MRAM assisted device in operation S440. In some embodiments, determining the magnetic orientation of the first magnetic layer includes applying a read current to the SOT layer of the MRAM assisted non-volatile Hall effect device in operation S450.

Figure 17:
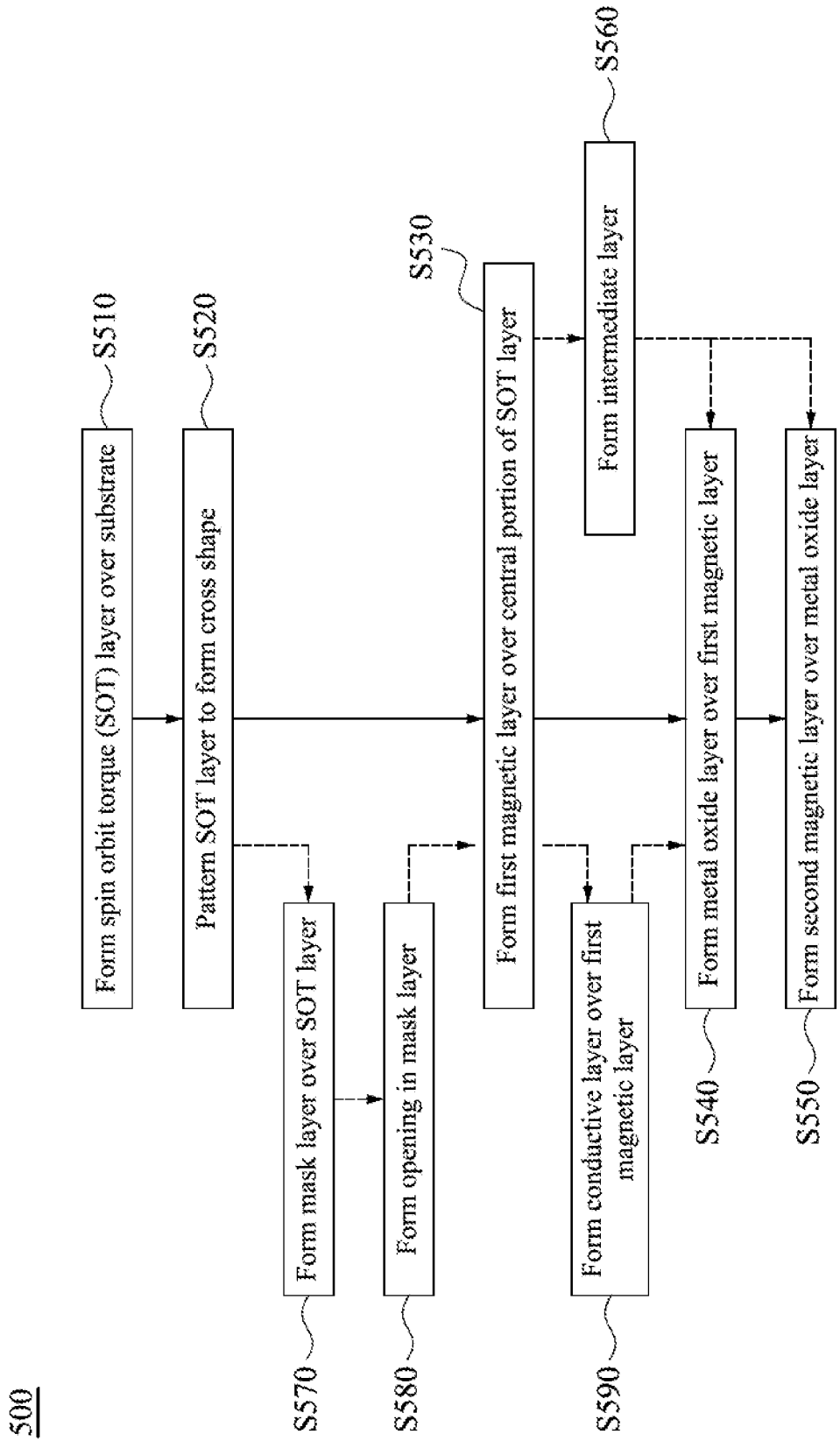
FIG. 17 is a flowchart illustrating a method of manufacturing an MRAM assisted device according to an embodiment of the disclosure.

FIG. 17 is a flowchart illustrating a method of manufacturing an MRAM assisted device according to an embodiment of the disclosure. In operation S510, a spin orbit torque layer 10 is formed over a substrate 5. The spin orbit torque layer 10 is patterned to form a cross-shaped spin orbit torque layer over the substrate 5 in operation S520. In operation S530, a first magnetic layer 20 is formed over a central portion of the cross-shaped spin orbit torque layer 10, and a metal oxide layer 30 is formed over the first magnetic layer 20 in operation S540. Portions of the spin orbit torque layer 10 extend outwards from the first magnetic layer 20 and the metal oxide layer 30 on opposing sides of a first direction and opposing sides of a second direction in plan view, wherein the second direction is perpendicular to the first direction. In some embodiments, a second magnetic layer 40 is formed over the first magnetic layer 20 in operation S550. In some embodiments, a mask with an opening is formed over a central portion of the spin orbit torque layer, and the second magnetic layer is formed in the mask opening. In some embodiments, in operation S560, an intermediate layer 60 is formed between the operations of forming the first magnetic layer 20 and the second magnetic layer 40. In some embodiments, a mask with an opening is formed over a central portion of the spin orbit torque layer 10, and the intermediate layer 60 is formed in the mask opening. In some embodiments, a mask layer is formed over the spin orbit torque layer before forming the first magnetic layer in operation S570, and an opening is formed in the mask layer, in operation S580, exposing the central portion of the spin orbit torque layer. In some embodiments, the mask layer includes a photoresist layer. In some embodiments, the metal oxide layer 30 comprises a material that maintains a perpendicular magnetic anisotropy of the first magnetic layer 20. In some embodiments, an electrically conductive layer 50 is formed over the first magnetic layer 20 in operation S590.

FIG. 18 shows the randomness in a 10×8 array 600 of MRAM assisted devices upon the application of a write current that is close to the threshold current. The devices that change magnetic orientation are designated as "1" and devices that do not change orientation are designates as "0." Due to minor variations in the individual SOT MRAM cells, such as variations in layer thicknesses, a random pattern of cells that change magnetic orientation and cells that do not change orientation is produced. Thus, the array can be used in physical unclonable function (PUF) applications, such as an electronic identification. In some embodiments, these random patterns can be used as a security feature, such as a magnetic strip on a credit card.

Figure 19A:
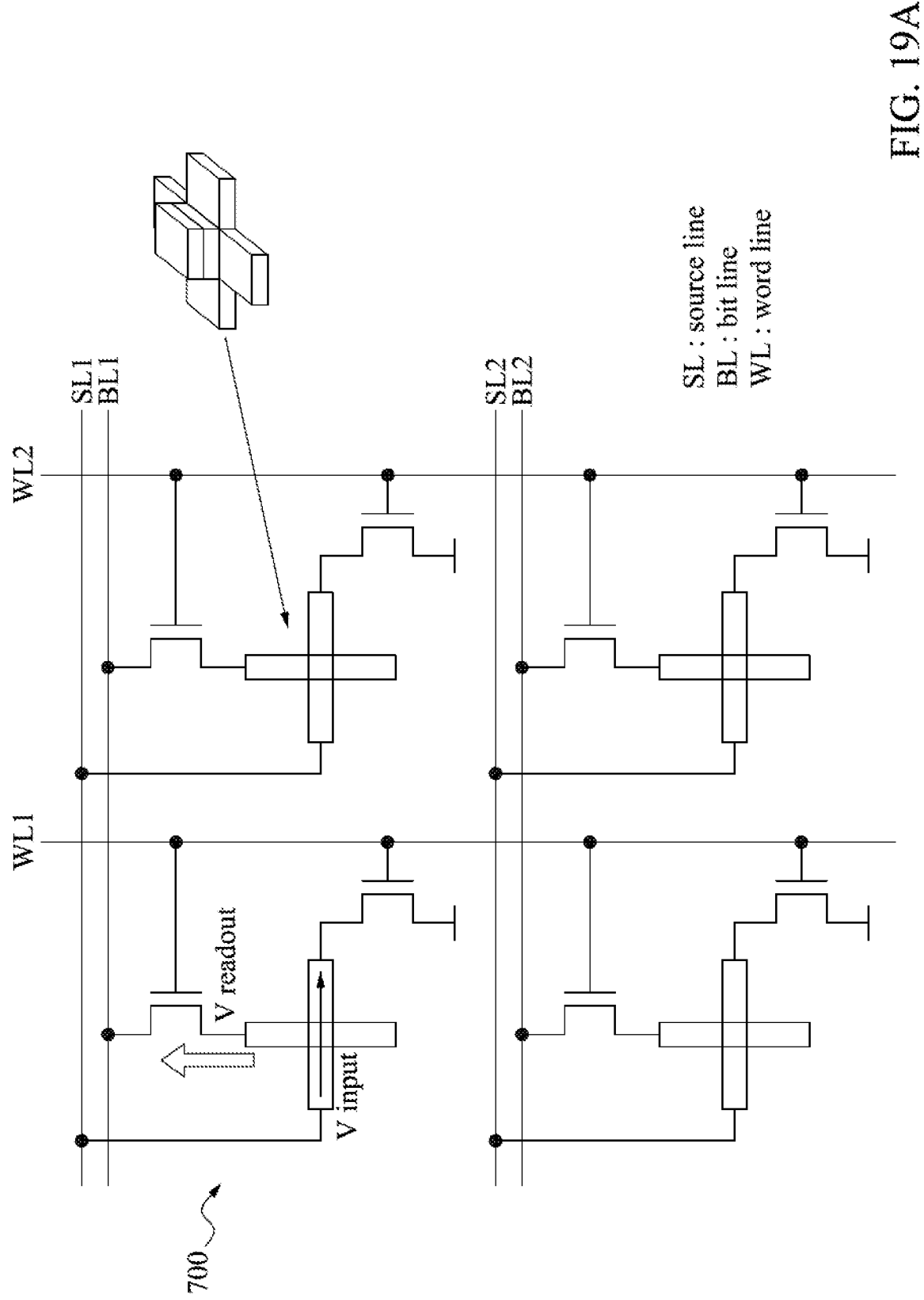
FIGS. 19A and 19B illustrate writing to and reading an MRAM assisted device in an array according to embodiments of the disclosure.
Figure 19B:
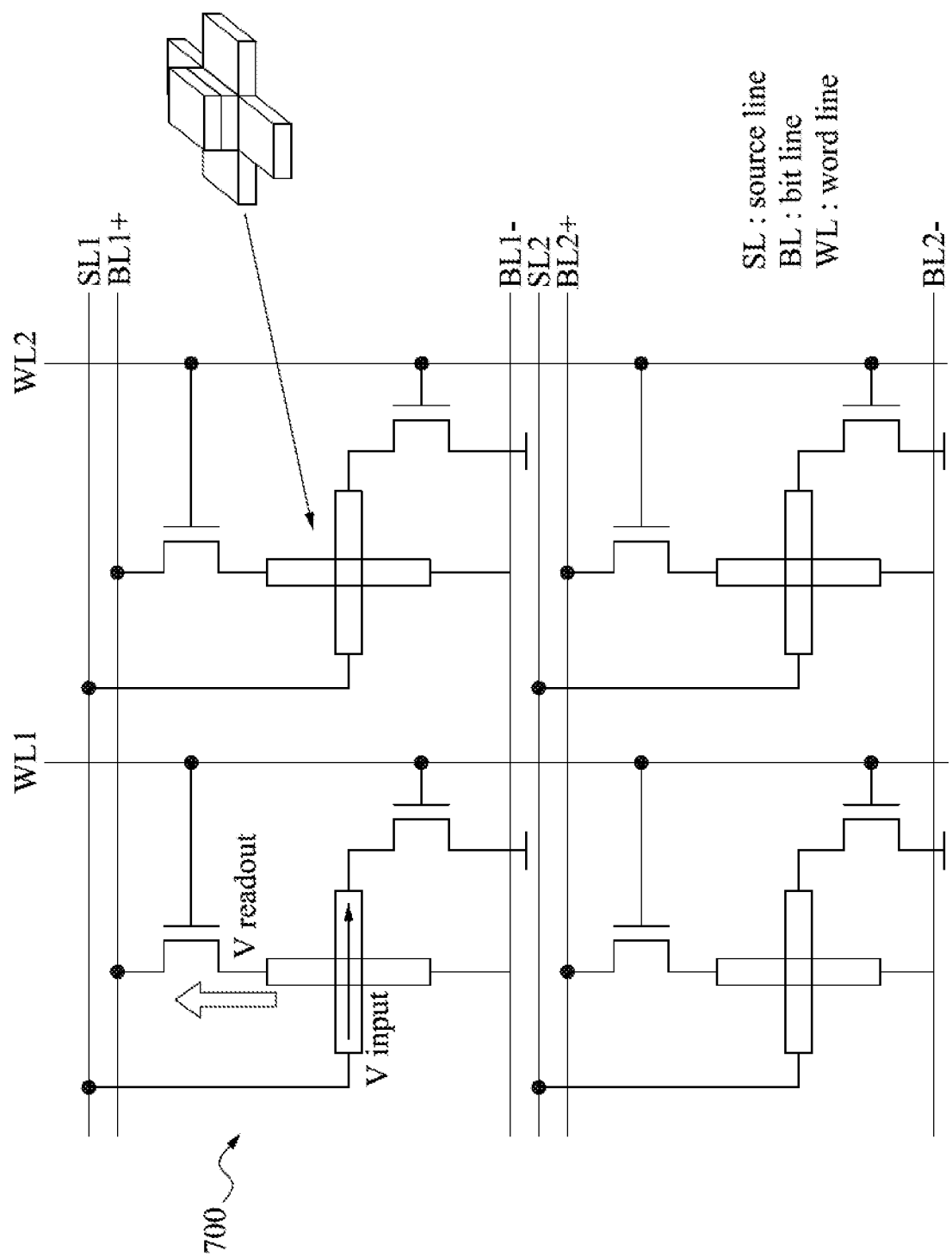

FIG. 19A illustrates a portion of the wiring of a circuit 700 containing an array of MRAM assisted devices according to an embodiment of the disclosure. The devices are connected to word lines WL, source lines SL, and bit lines BL. As shown, a write current is applied to the device from the source line SL1 to the word line WL1. The transverse (Hall) voltage signal is read at the bit line BL1. In some embodiments, the portion of the spin orbit torque layer opposite the V readout is floating. Charge will accumulate on the floating side of SOT layer. In other embodiments, the SOT layer does not include a floating. In some embodiments, another bit line BL1-, BL2- is connected to the opposite side of the spin orbit torque layer from the V readout, as shown in FIG. 19B. In some embodiments, connecting opposing sides of the spin orbit torque layer to two bit lines (e.g. BL1+ and BL1-) provides improved signals.

The Hall voltage signal ranges from about 3% to about 50% of the applied current in some embodiments. The value of the Hall voltage signal depends on the SOT material. When a specific word line WL is activated, two transistors of one cell are turned on. Then, an input (or write) current flows through the spin orbit torque layer of the MRAM assisted device, which generates a Hall voltage Vreadout. The Hall voltage Vreadout appears on the bit line as data of the cell. For example, activating WL1 and SL1 causes a voltage readout Vreadout at the 11 (WL1 and BL1) position. When WL1 and BL2 are activated, a voltage readout Vreadout is caused at the 12 (WL1 and BL2) position, and so on.

Figure 20A:
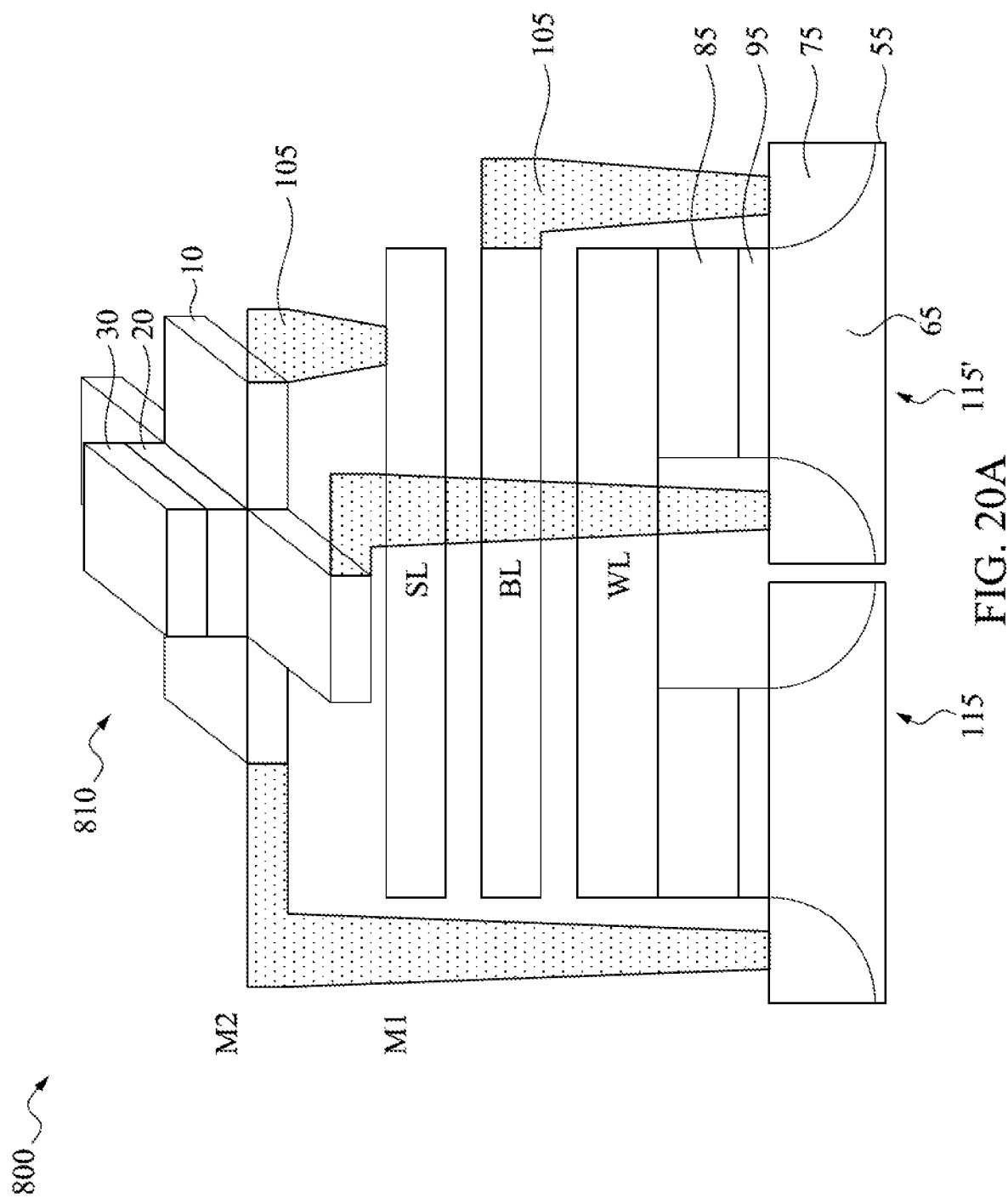
FIGS. 20A, 20B, and 20C illustrate an MRAM assisted device embedded in an integrated circuit.
Figure 20C:
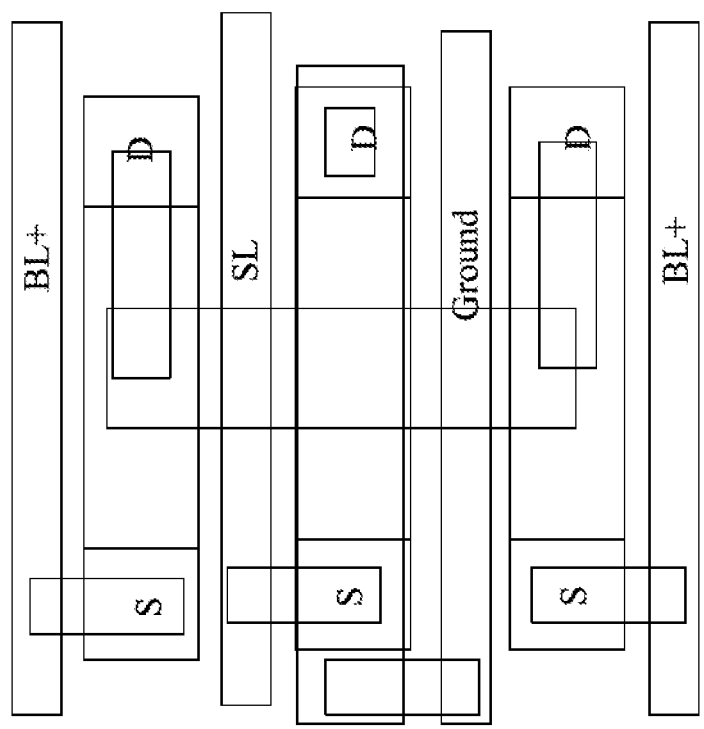
Figure 20B:
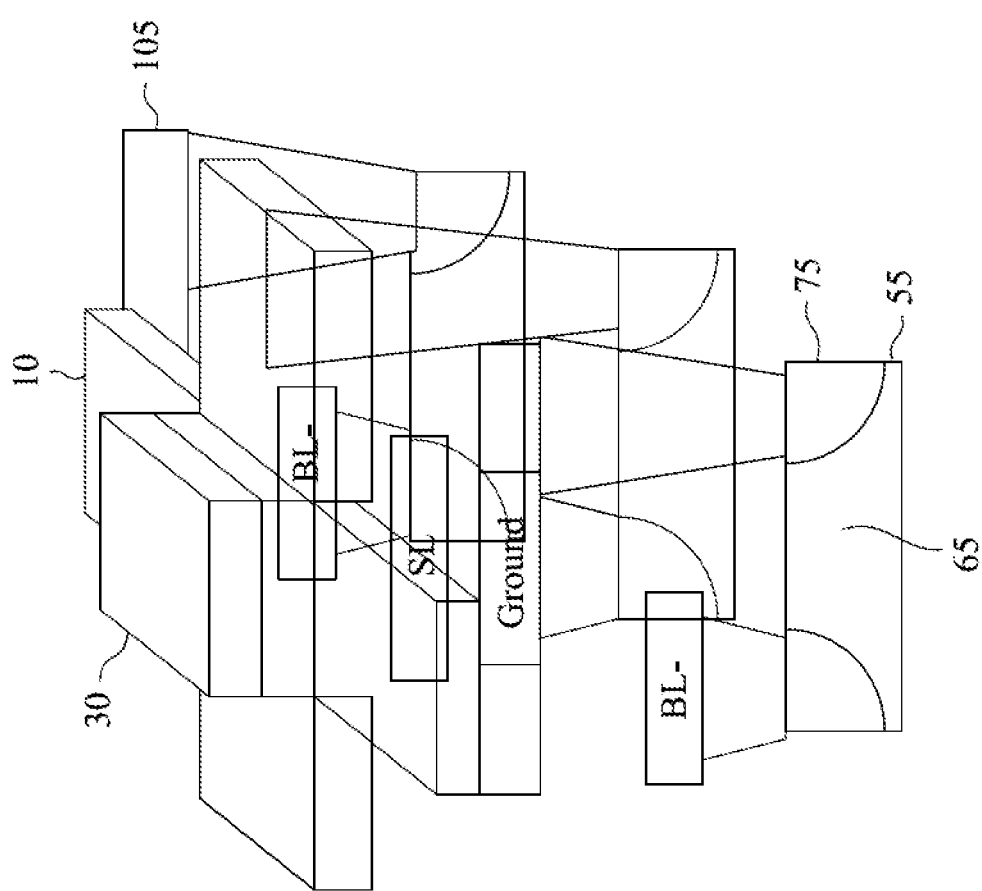

FIGS. 20A, 20B, and 20C illustrate an embodiment of an MRAM assisted device 810 embedded in an integrated circuit 800. As shown in FIG. 20A, the device 810 is located at the M2 wiring level above the source line SL, bit line BL, and word line WL of the integrated circuit 800. The device is connected by electrically conductive contacts 105 to the source line SL and the source/drain regions 75 of the transistors 115, 115' below the M1 wiring level. The transistors 115, 115' include a gate electrode 85 and gate dielectric layer 95 overly a channel region 65 between the source/drain regions 75 formed in a semiconductor substrate 55. In some embodiments, the gate electrodes 85 of adjacent transistors 115, 115' are connected by the word line WL. FIG. 20B is an isometric (three-dimensional) view of the MRAM assisted device of FIG. 20A, and FIG. 20C is a top view of the MRAM assisted device of FIG. 20A.

MRAM assisted devices according to the present disclosure can provide an order-of-magnitude improvement of write current and speed. Devices according to the present disclosure are beneficial for high-speed, low power cache applications. In some embodiments, MRAM assisted non-volatile memory Hall sensor switches are formed. The MRAM assisted non-volatile memory Hall sensor switches do not require an external magnetic field. In some embodiments, the magnetic non-volatile memory of the devices according to the disclosure maintain their magnetic orientation for about 10 years or more. The naturally occurring randomness in the coercivity of devices according to the present disclosure is beneficial in physical unclonable function (PUF) applications, including electronic identification applications.

An embodiment of the disclosure is a magnetic random access memory assisted non-volatile Hall effect device, including a spin orbit torque layer disposed over a substrate, and a magnetic layer disposed over the spin orbit torque layer. A metal oxide layer is disposed over the magnetic layer. Portions of the spin orbit torque layer extend outward from the magnetic layer and the metal oxide layer on opposing sides of a first direction and opposing sides of a second direction in plan view, wherein the second direction is perpendicular to the first direction. In an embodiment, the metal oxide layer includes a material that maintains a perpendicular magnetic anisotropy of the magnetic layer. In an embodiment, the magnetic layer has a coercivity of greater than 500 Gauss. In an embodiment, the metal oxide layer comprises MgO. In an embodiment, the magnetic layer includes a CoFeB material. In an embodiment, the spin orbit torque layer includes one or more of platinum, tungsten, tantalum, and PtMn. In an embodiment, the substrate includes a semiconductor substrate. In an embodiment, the substrate includes silicon. In an embodiment, the substrate includes a semiconductor substrate with an insulating layer interposed between the semiconductor substrate and the spin orbit torque layer. In an embodiment, the spin orbit torque layer is cross-shaped in plan view and the magnetic layer and metal oxide layers are disposed over a center portion of the cross-shaped spin orbit torque layer. In an embodiment, a magnetic orientation of the magnetic layer is changed by the application of a current density of $10^{11}$ A/m$^2$ to the spin orbit torque layer. In an embodiment, the device retains its magnetic orientation for 10 years without the application of an external current or magnetic field. In an embodiment, the device includes a second magnetic layer disposed over the metal oxide layer.

An embodiment of the disclosure is a method of manufacturing a magnetic random access memory assisted non-volatile Hall effect device, including forming a spin orbit torque layer over a substrate and forming a magnetic layer over the spin orbit torque layer. A metal oxide layer is formed over the magnetic layer. The spin orbit torque layer, magnetic layer, and metal oxide layer are patterned so that portions of the spin orbit torque layer extend outward from the magnetic layer and the metal oxide layer on opposing sides of a first direction and opposing sides of a second direction in plan view, wherein the second direction is perpendicular to the first direction. In an embodiment, the metal oxide layer includes a material that maintains a perpendicular magnetic anisotropy of the magnetic layer. In an embodiment, the metal oxide layer includes MgO. In an embodiment, the magnetic layer has a coercivity of greater than 500 Gauss. In an embodiment, the magnetic layer includes a CoFeB material. In an embodiment, the spin orbit torque layer includes one or more of platinum, tungsten, tantalum, and PtMn. In an embodiment, the substrate includes a semiconductor substrate. In an embodiment, the substrate includes silicon. In an embodiment, the substrate includes a semiconductor substrate with an insulating layer interposed between the semiconductor substrate and the spin orbit torque layer. In an embodiment, the spin orbit torque layer, magnetic layer, and metal oxide layer are patterned so that the spin orbit torque layer is cross-shaped in plan view and the magnetic layer and metal oxide layer are disposed over a center portion of the cross-shaped spin orbit torque layer.

Another embodiment of the disclosure is a magnetic random access memory (MRAM) assisted non-volatile physically unclonable function (PUF) device, including a spin orbit torque layer having a first region extending in a first direction disposed over a substrate. A plurality of second regions of the spin orbit torque layer extend along a second direction perpendicular to the first direction. The plurality of second regions are spaced apart from each other along the first direction. A plurality of first magnetic layers are disposed on the first region of the spin orbit torque layer. The first magnetic layers are each located between a pair of second regions extending in the second direction from the first region of the spin orbit torque layer. A metal oxide layer is disposed over each of the first magnetic layers. In an embodiment, the device includes a second magnetic layer disposed over each of the metal oxide layers. In an embodiment, the device includes an intermediate layer disposed between each of the metal oxide and second magnetic layers. In an embodiment, the device includes a conductive layer disposed over each of the metal oxide layers. In an embodiment, the spin orbit torque layer includes one or more of platinum, tungsten, tantalum, and PtMn. In an embodiment, the substrate includes a semiconductor substrate with an insulating layer interposed between the semiconductor substrate and the spin orbit torque layer. In an embodiment, the first magnetic layer includes a CoFeB material. In an embodiment, the first magnetic layers have a coercivity of greater than 500 Gauss. In an embodiment, a magnetic orientation of one or more of the first magnetic layers is changed by the application of a current density of $10^{11}$ A/m² to the spin orbit torque layer.

Another embodiment of the disclosure is a method of manufacturing a magnetic random access memory assisted non-volatile Hall effect device, includes forming a spin orbit torque layer over a substrate, and patterning the spin orbit torque layer to form a cross-shaped spin orbit torque layer over the substrate. A first magnetic layer is formed over a central portion of the cross-shaped spin orbit torque layer, and a metal oxide layer is formed over the first magnetic layer. In an embodiment, portions of the spin orbit torque layer extend outwards from the first magnetic layer and the metal oxide layer on opposing sides of a first direction and opposing sides of a second direction in plan view, wherein the second direction is perpendicular to the first direction. In an embodiment, the method includes forming a mask layer over the spin orbit torque layer before forming the first magnetic layer. In an embodiment, the method including forming an opening in the mask layer exposing the central portion of the spin orbit torque layer. In an embodiment, the mask layer includes a photoresist layer. In an embodiment, the metal oxide layer includes a material that maintains a perpendicular magnetic anisotropy of the first magnetic layer. In an embodiment, the method includes forming a conductive layer over the first magnetic layer. In an embodiment, the method includes forming a second magnetic layer over the first magnetic layer. In an embodiment, the method includes forming a mask with an opening over a central portion of the spin orbit torque layer, wherein the second magnetic layer is formed in the mask opening. In an embodiment, the method includes forming an intermediate layer between the first magnetic layer and the second magnetic layer. In an embodiment, the method includes forming a mask with an opening over a central portion of the spin orbit torque layer, wherein the intermediate layer is formed in the mask opening.

Another embodiment of the disclosure is a method of manufacturing a magnetic random access memory assisted device, including forming a spin orbit torque layer over a substrate and forming a first magnetic layer over the spin orbit torque layer. A metal oxide layer is formed over the magnetic layer and a second magnetic layer is formed over the metal oxide layer. The spin orbit torque layer, first magnetic layer, metal oxide layer, and second magnetic layer are patterned so that portions of the spin orbit torque layer extend outward from the first magnetic layer, the metal oxide layer, and the second magnetic layer on opposing sides of a first direction and opposing sides of a second direction in plan view, wherein the second direction is perpendicular to the first direction. In an embodiment, the method includes forming a conductive layer over the second magnetic layer. In an embodiment, the method includes forming an intermediate layer between the metal oxide layer and the second magnetic layer. In an embodiment, the metal oxide layer includes a material that maintains a perpendicular magnetic anisotropy of the first magnetic layer. In an embodiment, the first magnetic layer has a coercivity of greater than 500 Gauss. In an embodiment, the magnetic layer comprises a CoFeB material. In an embodiment, the spin orbit torque layer includes one or more of platinum, tungsten, tantalum, and PtMn. In an embodiment, the substrate includes a semiconductor substrate. In an embodiment, the substrate includes silicon. In an embodiment, the substrate includes a semiconductor substrate with an insulating layer interposed between the semiconductor substrate and the spin orbit torque layer. In an embodiment, the spin orbit torque layer, magnetic layer, and metal oxide layer are patterned so that the spin orbit torque layer is cross-shaped in plan view and the magnetic layer and metal oxide layer are disposed over a center portion of the cross-shaped spin orbit torque layer.

Another embodiment is a method manufacturing a magnetic random access memory assisted device, including forming a spin orbit torque layer over a substrate and forming a first magnetic layer over the spin orbit torque layer. A metal oxide layer is formed over the magnetic layer. A second magnetic layer is formed over the metal oxide layer. The spin orbit torque layer, first magnetic layer, metal oxide layer, and second magnetic layer are patterned so that portions of the spin orbit torque layer extend outward from the first magnetic layer, the metal oxide layer, and the second magnetic layer on opposing sides of a first direction and opposing sides of a second direction in plan view, wherein the second direction is perpendicular to the first direction. In an embodiment, the method includes forming a conductive layer over the second magnetic layer. In an embodiment, the method includes forming an intermediate layer between the metal oxide layer and the second magnetic layer. In an embodiment, the metal oxide layer comprises a material that maintains a perpendicular magnetic anisotropy of the first magnetic layer. In an embodiment, the first magnetic layer has a coercivity of greater than 500 Gauss. In an embodiment, the magnetic layer includes a CoFeB material. In an embodiment, the spin orbit torque layer comprises one or more of platinum, tungsten, tantalum, and PtMn. In an embodiment, the substrate includes a semiconductor substrate. In an embodiment, the substrate includes silicon. In an embodiment, the substrate includes a semiconductor substrate with an insulating layer interposed between the semiconductor substrate and the spin orbit torque layer. In an embodiment, the spin orbit torque layer, magnetic layer, and metal oxide layer are patterned so that the spin orbit torque layer is cross-shaped in plan view and the magnetic layer and metal oxide layer are disposed over a center portion of the cross-shaped spin orbit torque layer.

Another embodiment is a magnetic random access memory assisted device, including a spin orbit torque layer disposed over a substrate, and a first magnetic layer disposed over the spin orbit torque layer. A metal oxide layer is disposed over the magnetic layer, and a second magnetic layer disposed over the metal oxide layer. Portions of the spin orbit torque layer extend outward from the first magnetic layer, the metal oxide layer, and the second magnetic layer on opposing sides of a first direction and opposing sides of a second direction in plan view, wherein the second direction is perpendicular to the first direction. In an embodiment, the metal oxide layer includes a material that maintains a perpendicular magnetic anisotropy of the first magnetic layer. In an embodiment, the first magnetic layer has a coercivity of greater than 500 Gauss. In an embodiment, the metal oxide layer includes MgO. In an embodiment, the first magnetic layer includes a CoFeB material. In an embodiment, the spin orbit torque layer includes one or more of platinum, tungsten, tantalum, and PtMn. In an embodiment, the substrate includes a semiconductor substrate. In an embodiment, the substrate includes a semiconductor substrate with an insulating layer interposed between the semiconductor substrate and the spin orbit torque layer. In an embodiment, the spin orbit torque layer is cross-shaped in plan view and the magnetic layer and metal oxide layers are disposed over a center portion of the cross-shaped spin orbit torque layer. In an embodiment, the device includes a conductive layer disposed over the second magnetic layer. In an embodiment, the device includes an intermediate layer disposed between the metal oxide layer and the second magnetic layer. In an embodiment, a magnetic orientation of the first magnetic layer is changed by the application of a current density of $10^{11}$ A/m² to the spin orbit torque layer. In an embodiment, the device retains its magnetic orientation for 10 years without the application of an external current or magnetic field.

Another embodiment is a method of writing to a magnetic random access memory (MRAM) assisted device, including determining a magnetic orientation of a first magnetic layer of the MRAM assisted non-volatile Hall effect device. The device includes a spin orbit torque layer disposed over a substrate, the first magnetic layer disposed over the spin orbit torque layer, and a metal oxide layer disposed over the first magnetic layer. A current density of at least $10^{11}$ A/m² to a spin orbit torque layer. In an embodiment, the method includes determining whether the magnetic orientation of the first magnetic layer has changed after the applying a current density of at least $10^{11}$ A/m² to a spin orbit torque layer. In an embodiment, determining whether the magnetic orientation of the first magnetic layer has changed includes applying a read current to the MRAM assisted device. In an embodiment, determining the magnetic orientation of a first magnetic layer includes applying a read current to the MRAM assisted device.

Another embodiment is a method of generating random data, including initializing a plurality of magnetic random access memory assisted cells so that a magnetic layer of each of the plurality of magnetic random access memory assisted cells is oriented in a first orientation. Each of the plurality of the magnetic random access memory assisted cells includes: a spin orbit torque layer, the magnetic layer disposed over the spin orbit torque layer, and a non-magnetic layer disposed over the magnetic layer. Portions of the spin orbit torque layer extend outward from the magnetic layer and the non-magnetic layer on opposing sides of a first direction and opposing sides of a second direction in plan view, the second direction is perpendicular to the first direction, and adjacent magnetic random access memory assisted cells are connected to each other along the first direction by the spin orbit torque layer. A current is applied to the spin torque layer along the first direction so that the magnetic orientation of the magnetic layer of one or more of the magnetic random access memory assisted cells is changed from the first orientation to a second orientation. In an embodiment, the method includes varying the current to vary a number of magnetic layers that change from the first orientation to the second orientation. In an embodiment, the initializing a plurality of magnetic random access memory assisted cells so that a magnetic layer of each of the plurality of magnetic random access memory assisted cells is oriented in a first orientation is performed by applying an external magnetic field to the plurality of magnetic random access memory assisted cells. In an embodiment, the initializing a plurality of magnetic random access memory assisted cells so that a magnetic layer of each of the plurality of magnetic random access memory assisted cells is oriented in a first orientation is performed by applying current in the first direction to the spin orbit torque layer. In an embodiment, the plurality of magnetic random access memory assisted cells is a linear array. In an embodiment, the plurality of magnetic random access memory assisted cells is two-dimensional array as viewed in a plan view. In an embodiment, the non-magnetic layer is a metal oxide layer. In an embodiment, the metal oxide is MgO. In an embodiment, each magnetic random access memory assisted cell includes a second magnetic layer disposed over the non-magnetic layer.

It will be understood that not all advantages have been necessarily discussed herein, no particular advantage is required for all embodiments or examples, and other embodiments or examples may offer different advantages.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A magnetic random access memory assisted non-volatile Hall effect device, comprising:
a spin orbit torque layer disposed over a substrate;
a first magnetic layer disposed over the spin orbit torque layer;
a metal oxide layer disposed over the magnetic layer;
a second magnetic layer disposed over the metal oxide layer;
an antiferromagnetic layer disposed over the second magnetic layer; and
a third magnetic layer disposed over the second magnetic layer,
wherein portions of the spin orbit torque layer extend outward from the first magnetic layer and the metal oxide layer on opposing sides of a first direction and opposing sides of a second direction in plan view, wherein the second direction is perpendicular to the first direction.

2. The magnetic random access memory assisted non-volatile Hall effect device of claim 1, wherein the metal oxide layer comprises a material that maintains a perpendicular magnetic anisotropy of the magnetic layer.

3. The magnetic random access memory assisted non-volatile Hall effect device of claim 1, wherein the magnetic layer has a coercivity of greater than 500 Gauss.

4. The magnetic random access memory assisted non-volatile Hall effect device of claim 1, wherein the metal oxide layer comprises MgO.

5. The magnetic random access memory assisted non-volatile Hall effect device of claim 1, wherein the magnetic layer comprises a CoFeB material.

6. The magnetic random access memory assisted non-volatile Hall effect device of claim 1, wherein the spin orbit torque layer comprises one or more of platinum, tungsten, tantalum, and PtMn.

7. The magnetic random access memory assisted non-volatile Hall effect device of claim 1, wherein the substrate comprises a semiconductor substrate.

8. The magnetic random access memory assisted non-volatile Hall effect device of claim 1, wherein the substrate comprises a semiconductor substrate with an insulating layer interposed between the semiconductor substrate and the spin orbit torque layer.

9. The magnetic random access memory assisted non-volatile Hall effect device of claim 1, wherein the spin orbit torque layer is cross-shaped in plan view and the magnetic layer and metal oxide layers are disposed over a center portion of the cross-shaped spin orbit torque layer.

10. The magnetic random access memory assisted non-volatile Hall effect device of claim 1, wherein the first magnetic layer and the second magnetic layer are made of different materials.

11. A magnetic random access memory (MRAM) assisted non-volatile physically unclonable function (PUF) device, comprising:
   a spin orbit torque layer having a first region extending in a first direction disposed over a substrate;
   a plurality of second regions of the spin orbit torque layer extending along a second direction perpendicular to the first direction,
   wherein the plurality of second regions are spaced apart from each other along the first direction;
   a plurality of first magnetic layers disposed on the first region of the spin orbit torque layer,
   wherein the first magnetic layers are each located between a pair of second regions extending in the second direction from the first region of the spin orbit torque layer; and
   a metal oxide layer disposed over each of the first magnetic layers.

12. The MRAM assisted non-volatile PUF device of claim 11, further comprising a second magnetic layer disposed over each of the metal oxide layers.

13. The MRAM assisted non-volatile PUF device of claim 12, further comprising an intermediate layer disposed between each of the metal oxide and second magnetic layers.

14. The MRAM assisted non-volatile PUF device of claim 11, further comprising a conductive layer disposed over each of the metal oxide layers.

15. The MRAM assisted non-volatile PUF device of claim 11, wherein the spin orbit torque layer comprises one or more of platinum, tungsten, tantalum, and PtMn.

16. The MRAM assisted non-volatile PUF device of claim 11, wherein the substrate comprises a semiconductor substrate with an insulating layer interposed between the semiconductor substrate and the spin orbit torque layer.

17. The MRAM assisted non-volatile PUF device of claim 11, wherein the first magnetic layers comprise a CoFeB material.

18. The MRAM assisted non-volatile PUF device of claim 11, wherein the first magnetic layers have a coercivity of greater than 500 Gauss.

19. A method of manufacturing a magnetic random access memory assisted non-volatile Hall effect device, comprising:
   forming a spin orbit torque layer over a substrate;
   patterning the spin orbit torque layer to form a cross-shaped spin orbit torque layer over the substrate;
   forming a first magnetic layer over a central portion of the cross-shaped spin orbit torque layer;
   forming a metal oxide layer over the first magnetic layer;
   forming a second magnetic layer over the metal oxide layer;
   forming an antiferromagnetic layer over the second magnetic layer; and
   forming a third magnetic layer over the antiferromagnetic layer.

20. The method according to claim 19, wherein portions of the spin orbit torque layer extend outwards from the first magnetic layer and the metal oxide layer on opposing sides of a first direction and opposing sides of a second direction in plan view, wherein the second direction is perpendicular to the first direction.

* * * * *